US011124626B2

(12) United States Patent
Tahara

(10) Patent No.: US 11,124,626 B2
(45) Date of Patent: Sep. 21, 2021

(54) RUBBER COMPOSITION FOR PAPER FEED ROLL AND PAPER FEED ROLL

(71) Applicant: YAMAUCHI CORPORATION, Hirakata (JP)

(72) Inventor: Akitoshi Tahara, Hirakata (JP)

(73) Assignee: Yamauchi Corporation, Hirakata (JP)

( * ) Notice: Subject to any disclaimer, the term of this patent is extended or adjusted under 35 U.S.C. 154(b) by 533 days.

(21) Appl. No.: 16/098,480

(22) PCT Filed: Apr. 27, 2018

(86) PCT No.: PCT/JP2018/017224
§ 371 (c)(1),
(2) Date: Nov. 2, 2018

(87) PCT Pub. No.: WO2018/203531
PCT Pub. Date: Nov. 8, 2018

(65) Prior Publication Data
US 2021/0238387 A1 Aug. 5, 2021

(30) Foreign Application Priority Data
May 2, 2017 (JP) .............................. JP2017-092004

(51) Int. Cl.
C08K 5/109 (2006.01)
C08K 3/06 (2006.01)
B65H 5/06 (2006.01)
B65H 3/06 (2006.01)
C08L 23/16 (2006.01)

(52) U.S. Cl.
CPC ................ *C08K 5/109* (2013.01); *B65H 3/06* (2013.01); *B65H 5/06* (2013.01); *C08K 3/06* (2013.01); *C08L 23/16* (2013.01); *B65H 2404/10* (2013.01)

(58) Field of Classification Search
CPC ........ B65H 3/06; B65H 5/06; B65H 2404/10; C08K 3/06; C08K 5/109; C08L 23/16
See application file for complete search history.

(56) References Cited

U.S. PATENT DOCUMENTS

| 5,059,648 A * | 10/1991 | Fukushima ............. C08L 33/04 524/376 |
| 6,127,031 A * | 10/2000 | Fukumoto .............. B65H 27/00 399/174 |
| 2003/0032714 A1 * | 2/2003 | Kawasaki ............... C08L 23/16 524/554 |
| 2004/0082725 A1 | 4/2004 | Mabuchi et al. |

FOREIGN PATENT DOCUMENTS

| CN | 1496943 A | 5/2004 |
| CN | 1891749 A | 1/2007 |
| CN | 103183874 A | 7/2013 |
| JP | 09-031269 A | 2/1997 |
| JP | 10-279115 A | 10/1998 |
| JP | 2001-171851 A | 6/2001 |
| JP | 2003-237968 A | 8/2003 |
| JP | 2004-210437 A | 7/2004 |
| JP | 2006-8922 * | 1/2006 |
| JP | 2007-002015 A | 1/2007 |
| JP | 2013-139315 A | 7/2013 |
| JP | 2014-119399 A | 6/2014 |

OTHER PUBLICATIONS

Machine English translation of JP 2006-008922, Natsuyama et al., Jan. 2006.*
Communication dated Oct. 31, 2019, from the China National Intellectual Property Administration in counterpart Application No. 201880002237.X.
International Search Report of PCT/JP2018/017224 dated May 29, 2018.

* cited by examiner

*Primary Examiner* — Patrick D Niland
(74) *Attorney, Agent, or Firm* — Sughrue Mion, PLLC

(57) ABSTRACT

A rubber composition for a paper feed roll contains at least a polymer component and a softener, has a 30% Mod (−40° C.) of less than or equal to 0.94 MPa, the 30% Mod (−40° C.) representing a modulus in 30% elongation at −40° C., and has an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in temperature variance measurement of dynamic viscoelasticity, divided by the number of parts by mass of the softener relative to 100 parts by mass of the polymer component. These configurations provide a rubber composition for a paper feed roll and a paper feed roll that are excellent in maintainability of a coefficient of friction and wear resistance.

18 Claims, 15 Drawing Sheets

RUBBER COMPOSITION FOR PAPER FEED ROLL AND PAPER FEED ROLL

CROSS REFERENCE TO RELATED APPLICATIONS

This application is a National Stage of International Application No. PCT/JP2018/017224 filed Apr. 27, 2018, claiming priority based on Japanese Patent Application No. 2017-092004 filed May 2, 2017.

TECHNICAL FIELD

The present invention relates to a rubber composition for a paper feed roll (hereinafter, also simply described as a "rubber composition"), and a paper feed roll including a rubber layer formed of the rubber composition.

BACKGROUND ART

Natural rubber (NR), urethane rubber, an ethylene-propylene-diene copolymer (hereinafter, also described as an "EPDM"), polynorbornene rubber, silicone rubber, chlorinated polyethylene rubber, or the like is used for a paper feed roll included in, for example, office automation equipment such as an electrostatic copying machine, a laser printer, and a fax machine, or an automated teller machine. Among these, an EPDM is used in many cases because it is cheap and excellent in weather resistance. Such a paper feed roll is required of maintainability of a coefficient of friction to suppress a decrease in delivery performance caused by supply of paper and stabilize the delivery performance over a long period, and the requirement is being more and more demanding along with diversification of the kind of paper. Techniques developed so far to cope with these requirements are exemplified by the techniques described in PTLs 1 to 4.

PTL 1 discloses a rubber composition that contains EPDM rubber as a main component and is characterized by having a JIS-A hardness in a range of 20 to 30 degrees and having a loss tangent (tan δ) at 50° C. in a range of 0.02 to 0.035.

PTL 2 discloses a rubber material for a paper sheet delivery member having a dynamic modulus of elasticity E' of 0.9 to 1.9 MPa under the conditions of a temperature of 25° C., a frequency of vibration of 15 Hz, and an elongation rate of 15±2%.

PTL 3 discloses a cross-linkable rubber composition characterized by containing 15 to 160 parts by weight of a long-chain alkyl carbonate represented by a following general formula (I) (B) relative to 100 parts by weight of ethylene-α-olefin-diene copolymer rubber (A)

$R^1OCOOR^2$            (I).

(In the formula, $R^1$ and $R^2$ are identical or different and are a straight-chain or branched alkyl group, a cycloalkyl group, or a cycloalkyl group-containing alkyl group each with 10 to 20 carbon atoms, and at least one of $R^1$ and $R^2$ is a straight-chain or branched alkyl group with 10 to 20 carbon atoms.)

PTL 4 discloses a rubber composition having, in temperature variance measurement of dynamic viscoelasticity, a maximum value of a loss tangent tan δ of less than or equal to 1.1 and a Tmax of less than or equal to −40° C., the Tmax representing a temperature at which the loss tangent tan δ exhibits the maximum value (hereinafter, described as T(tan δmax)), and having a dynamic modulus of elasticity E1 (22° C.) in a room temperature region of less than or equal to 2.1 MPa.

CITATION LIST

Patent Literatures

PTL 1: Japanese Patent Laying-Open No. 10-279115
PTL 2: Japanese Patent Laying-Open No. 2001-171851
PTL 3: Japanese Patent Laying-Open No. 09-31269
PTL 4: Japanese Patent Laying-Open No. 2013-139315

SUMMARY OF INVENTION

Technical Problem

The rubber composition disclosed in PTL 1 and the rubber material for a paper sheet delivery member disclosed in PTL 2, however, mainly focus on viscoelastic characteristics in a room temperature region or a higher temperature region than the room temperature region, that is, on controlling the viscoelastic characteristics in a frequency domain (1 to several hundred Hz) corresponding to one distortion per one rotation of a paper feed roll in, for example, office automation equipment, so that the rubber composition and the rubber material have exhibited an effect of improving an initial coefficient of friction and initial wear resistance to some extent but have been incapable of giving a sufficient effect of improving maintainability of a coefficient of friction through supply of paper.

The cross-linkable rubber composition disclosed in PTL 3 claims that the ethylene-α-olefin-diene copolymer rubber (A) can be blended with a certain amount of the long-chain alkyl carbonate (B) represented by the general formula (I) with the number of carbon atoms limited in $R^1$ and $R^2$, to improve cold resistance in comparison with the case of being blended with normally commercially available paraffin oil while imparting excellent wear resistance to the ethylene-α-olefin-diene copolymer rubber (A), giving vulcanized rubber that has small variation in coefficient of friction. A specific physical property parameter of the cold resistance, however, is not designated, and an existing softener that may be used in combination with the long-chain alkyl carbonate (B) is not also designated in terms of kinematic viscosity that affects the cold resistance. Accordingly, the present patent literature does not particularly consider the improvement of cold resistance in association with improvement of the coefficient of friction and claims that a reason for the improvement of maintainability of a coefficient of friction by a combination of the long-chain alkyl carbonate (B) with the ethylene-α-olefin-diene copolymer rubber (A) is because the long-chain alkyl carbonate (B) has an intermediate property between compatibility and a phase separation property with respect to the ethylene-α-olefin-diene copolymer rubber (A), so that a small amount of the long-chain alkyl carbonate (B) bleeds out to a surface of rubber to form a film. The improvement of wear resistance is being only presumed for the same reason. As a result, an upper limit value for the blending amount of the long-chain alkyl carbonate (B) is as many as 160 parts by weight, and further, an upper limit value for the desirable blending amounts of a rubber reinforcing material and a filler is also described as large a value as 200 parts by weight relative to 100 parts by weight of the ethylene-α-olefin-diene copolymer rubber (A). Therefore, it has been impossible to give a sufficient effect of improving the maintainability of a coefficient of friction through supply of paper (and improving the wear resistance) only by blending a certain amount of the long-chain alkyl carbonate (B) with the number of carbon atoms limited in $R^1$ and $R^2$ of the general formula (I), with the ethylene-α-olefin-diene copolymer rubber (A).

PTL 4 claims that it is possible to provide a paper feed roll excellent in maintainability of a coefficient of friction by producing a rubber layer of the paper feed roll using a rubber composition having a tan δmax (a maximum value of a loss tangent tan δ in temperature variance measurement of dynamic (storage) viscoelasticity) of less than or equal to 1.1, the tan δmax representing viscoelastic characteristics of a low temperature region in the temperature variance measurement of dynamic viscoelasticity, having a Tmax of less than or equal to −40° C., the Tmax representing a temperature at which the loss tangent tan δ exhibits the maximum value in the temperature variance measurement of dynamic viscoelasticity (hereinafter, described as T(tan δmax)), and having an E1 (22° C.) of less than or equal to 2.1 MPa, the E1 (22° C.) representing a dynamic (storage) modulus of elasticity at 22° C. in a room temperature region. Because of recent diversification of the kind of paper including an increase in distribution of bad-quality paper and paper from developing countries, the paper feed roll is required of suppressing a decrease in coefficient of friction caused by attachment of paper powder and further improving the wear resistance.

In view of the circumstances described above, an object of the present invention is to provide a rubber composition for a paper feed roll (hereinafter, also simply described as a "rubber composition") excellent in maintainability of a coefficient of friction and wear resistance, and thereby to provide a paper feed roll that is capable of realizing long term stability of performance for paper separation feeding with respect to diversified various types of paper.

Solution to Problem

[1] A rubber composition according to one aspect of the present invention contains at least a polymer component and a softener, has a 30% Mod (−40° C.) of less than or equal to 0.94 MPa, the 30% Mod (−40° C.) representing a modulus in 30% elongation at −40° C., and has an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in temperature variance measurement of dynamic viscoelasticity, divided by the number of parts by mass of the softener relative to 100 parts by mass of the polymer component.

[2] The rubber composition preferably has a 30% Mod (−40° C.) of less than or equal to 0.80 MPa and has a T(tan δmax) of less than or equal to −50° C., the T(tan δmax) representing a temperature at which a loss tangent tan δ exhibits a maximum value (tan δmax) in the temperature variance measurement of dynamic viscoelasticity.

[3] A rubber composition according to the present invention contains at least a polymer component and a softener, has an E1 (−30° C.) of less than or equal to 4.2 MPa, the E1 (−30° C.) representing a dynamic modulus of elasticity at −30° C. in temperature variance measurement of dynamic viscoelasticity and has an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in the temperature variance measurement of dynamic viscoelasticity, divided by the number of parts by mass of the softener relative to 100 parts by mass of the polymer component.

[4] The rubber composition preferably has an E1 (−30° C.) of less than or equal to 3.8 MPa and has a T(tan δmax) of less than or equal to −50° C., the T(tan δmax) representing a temperature at which a loss tangent tan δ exhibits a maximum value (tan δmax) in the temperature variance measurement of dynamic viscoelasticity.

[5] In the rubber composition, the polymer component preferably contains an ethylene-propylene-diene copolymer.

[6] In the rubber composition, the ethylene-propylene-diene copolymer preferably contains greater than or equal to 52% by mass and less than or equal to 70% by mass of an ethylene component unit and greater than or equal to 2.8% by mass and less than or equal to 5.5% by mass of a diene component unit.

[7] The rubber composition preferably contains greater than or equal to 45 parts by mass and less than or equal to 110 parts by mass of the softener relative to 100 parts by mass of the polymer component. The rubber composition more preferably contains greater than or equal to 45 parts by mass and less than or equal to 100 parts by mass of the softener relative to 100 parts by mass of the polymer component.

[8] The rubber composition preferably contains, as the softener, at least one of a paraffin-based petroleum blended oil, a poly-α-olefin, and a long-chain alkyl carbonate each having a kinematic viscosity at 40° C. of greater than or equal to 10 mm$^2$/s and less than or equal to 60 mm$^2$/s. Here, the kinematic viscosity at 40° C. of the softener is measured in accordance with JIS K2283: 2000 (Crude petroleum and petroleum products—Determination of kinematic viscosity and calculation of viscosity index from kinematic viscosity).

[9] The rubber composition more preferably contains, as the softener, at least one of a poly-α-olefin and a long-chain alkyl carbonate each having a kinematic viscosity at 40° C. of greater than or equal to 10 mm$^2$/s and less than or equal to 30 mm$^2$/s.

[10] The rubber composition preferably contains, as a cross-linking agent, greater than or equal to 1 part by mass and less than or equal to 2.8 parts by mass of sulfur relative to 100 parts by mass of the polymer component.

[11] A paper feed roll according to one aspect of the present invention includes a rubber layer formed of the rubber composition described above. Here, the paper feed roll is capable of delivering not only paper but also various sheet materials such as an OHP sheet and a plastic sheet.

Advantageous Effects of Invention

A rubber composition according to the present invention is capable of providing a rubber composition for a paper feed roll that is excellent in maintainability of a coefficient of friction and wear resistance, and thereby it is possible to realize long term stability of performance for paper separation feeding with respect to diversified various types of paper.

DESCRIPTION OF EMBODIMENTS

Embodiment 1: Rubber Composition

A rubber composition according to a present embodiment contains at least a polymer component and a softener, has a 30% Mod (−40° C.) of less than or equal to 0.94 MPa, the 30% Mod (−40° C.) representing a modulus in 30% elongation at −40° C., and has an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in temperature variance measurement of dynamic viscoelasticity, divided by the number of parts by mass of the softener relative to 100 parts by mass of the polymer component. The rubber composition according to the present embodiment is a rubber composition for a paper feed roll that is excellent in maintainability of a coefficient of friction and wear resistance.

Figure 1:
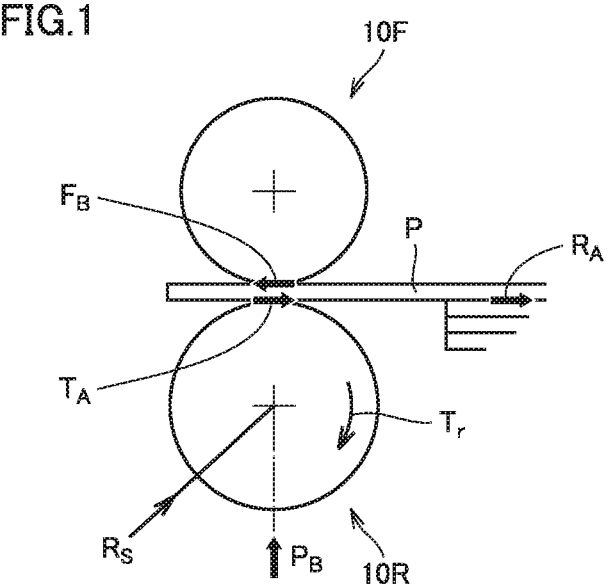
FIG. 1 is a schematic side view illustrating conditions for sending a first sheet of paper in a power balance model of FRR paper feeding.
Figure 2:
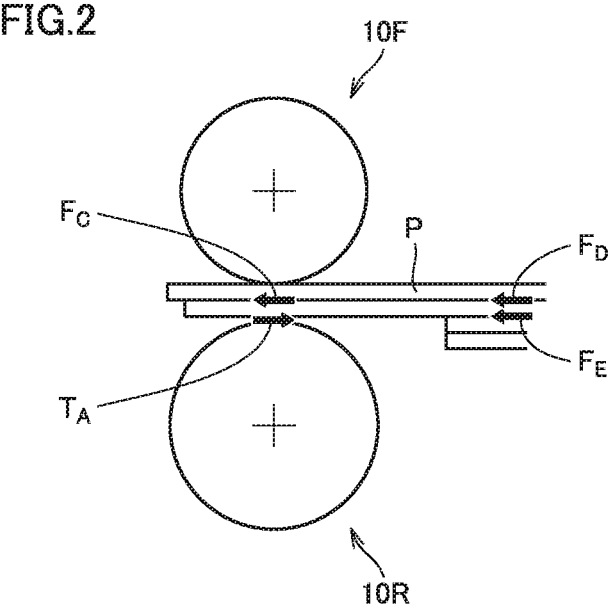
FIG. 2 is a schematic side view illustrating conditions for returning a second sheet of paper in a power balance model of the FRR paper feeding.

With reference to FIGS. 1 and 2, in order to separate and feed a sheet of paper in an FRR paper feeding system (as regards the FRR paper feeding system and a motion diagram of a paper delivery device described later, see Japanese Patent Laying-Open No. 2003-237968), the following conditions of sending a first sheet of paper need to be satisfied: with feeding force that a feed roll applies to the first sheet of paper defined as $F_B$, return force of a torque limiter as $T_A$, torque limiter torque as $T_r$, a radius of a retard roll as $R_S$, resistance force between sheets of paper as $R_A$, motion pressure of the retard roll as $P_B$, a coefficient of friction between the sheets of paper as $\mu_p$, a coefficient of friction between a rubber roll and paper as $\mu_r$, and the mass of paper as m, $F_B > T_A + R_A$, $F_B = \mu_r \cdot P_B$, and $R_A = \mu_p \cdot m$ that derive $$P_B > (1/\mu_r)T_A + (\mu_p/\mu_r)m \qquad (1).$$

Further, the following conditions of returning a second sheet of paper need to be satisfied: with feeding force that the first sheet of paper applies to the second sheet of paper defined as $F_C$ and return resistance force between the sheets of paper as $F_D$ and $F_E$, $T_A > F_C + F_D + F_E$, $F_C = \mu_p \cdot P_B$, $F_D = \mu_p \cdot m$, and $F_E = \mu_p \cdot 2m$ that derive $$P_B < (1/\mu_p)T_A - 3m \qquad (2).$$

Figure 4:
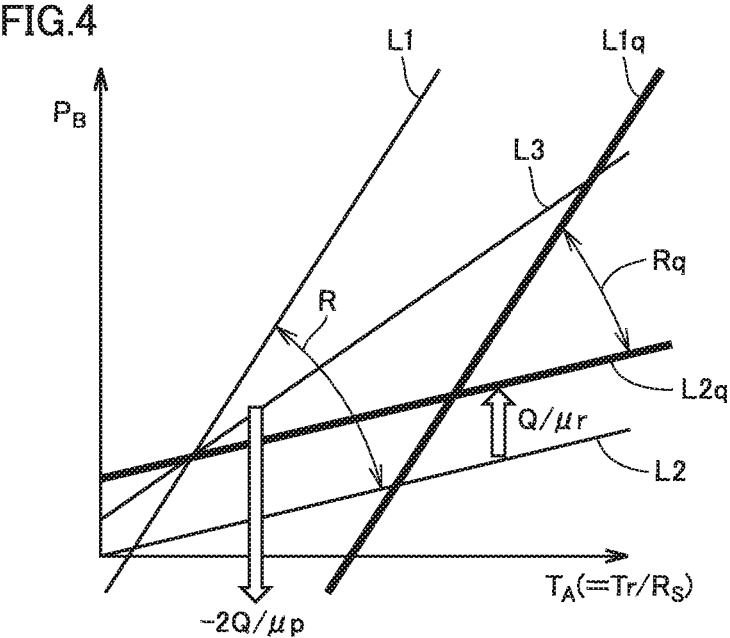
FIG. 4 is a motion diagram of a paper delivery device.

That is, with reference to FIG. 4, it is possible to separate and feed a sheet of paper in an appropriate region R between a non-feed boundary L2 and an overlap feed boundary L1.

Figure 3:
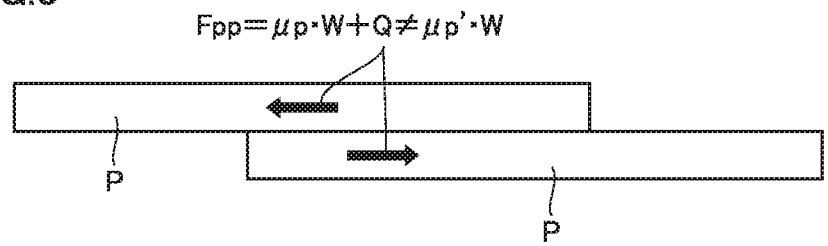
FIG. 3 is a schematic side view illustrating adhesion force between the first sheet of paper and the second sheet of paper in a power balance model of the FRR paper feeding.

Along with recent diversification of paper, it is necessary to separate and feed paper having a large adhesion force between sheets of paper Q that is not described in the formulae (1) and (2) (negligible in conventional paper) and is illustrated in FIG. 3. In FIG. 3, $F_{pp}$ represents resistance force between sheets of paper, $\mu_p$ represents a coefficient of friction between the sheets of paper, and W represents a load. Adhesion force between sheets of paper Q does not depend of load W. Therefore, the formulae (1) and (2) need to be corrected in consideration of adhesion force between sheets of paper Q. The formula (1) corrected in consideration of adhesion force between sheets of paper Q is:

$$P_B > (1/\mu_r)_A + (\mu_p/\mu_r)m + Q/\mu_r \qquad (3), \text{and}$$

the formula (2) corrected in view of adhesion force between sheets of paper Q is:

$$P_B < (1/\mu_p)T_A - 3m - 2Q/\mu_p \qquad (4).$$

That is, with reference to FIG. 4, it is possible to separate and feed a sheet of paper in an appropriate region Rq between a non-feed boundary L2q and an overlap feed boundary L1q that have been corrected in consideration of adhesion force between sheets of paper Q.

With reference to FIG. 4, appropriate region Rq corrected in consideration of adhesion force between sheets of paper Q is shifted to the diagram's high-torque side and high-load side in comparison with appropriate region R without consideration of adhesion force between sheets of paper Q. A paper feeding mechanism that is set to high torque and high load applies a large burden on a paper feed roll, so that a recent paper feed roll is being required of maintainability of a coefficient of friction and further improvement of durability (wear resistance). Known techniques of enhancing the wear resistance include blending of carbon black having a small particle size and a large surface area, an increase in cross-link density by reduction in the blending amount of oil and an increase in the amount of a cross-linking agent, or an increase in ethylene content of an EPDM in the case of a rubber composition containing the EPDM as a main component.

The blending of carbon black having a small particle size and a large surface area, however, leads to a rise in hardness accompanied by a decrease in coefficient of friction, and blackens a rubber roll to increase fear of dirt on a sheet. The reduction in the blending amount of a softener such as oil also leads to a rise in hardness accompanied by a decrease in coefficient of friction. Further, the reduction in the blending amount of a softener such as oil, based on a technique of PTL 4, causes a problem of raising T(tan δmax) and decreasing the maintainability of a coefficient of friction.

Figure 5:
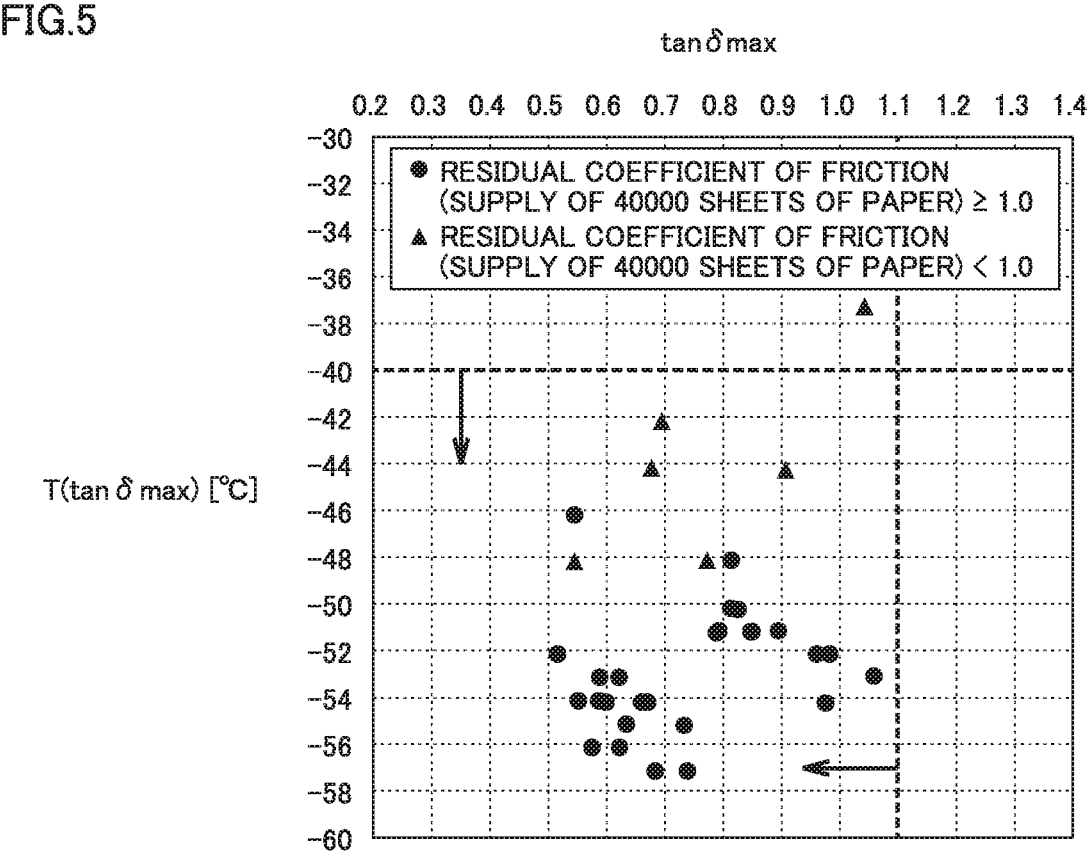
FIG. 5 is a graph illustrating the cases where even a paper feed roll formed of a rubber composition satisfying the requirements in claim 1 of PTL 4 lowers a residual coefficient of friction.

Effective to improve the wear resistance are improvement of cross-link density, for example, improvement of cross-link density by increasing the amount of sulfur in the case of blending a sulfur cross-linking system, or an increase of an ethylene component unit in an EPDM of a rubber composition containing the EPDM as a main component. Studies by the inventor of the present invention after application of PTL 4, however, have come to clarify that even when the conditions of claim 1 in PTL 4 are satisfied while these techniques are performed, high maintainability of a coefficient of friction cannot always be obtained as illustrated in FIG. 5. This means that for the maintainability of a coefficient of friction, another physical property parameter exists as a controlling factor, in addition to the tan δmax, the T(tan δmax), and the E1 (22° C.) described in PTL 4. The symbols plotted in FIG. 5 all satisfy the condition E1 (22° C.) 2.1 MPa. In FIG. 5, the horizontally extending dashed line represents a line of T(tan δmax)=−40° C., and the vertically extending dashed line represents tan δmax=1.1.

The rubber composition according to the present embodiment contains at least a polymer component and a softener, has a 30% Mod (−40° C.) of less than or equal to 0.94 MPa, the 30% Mod (−40° C.) representing a modulus in 30% elongation at −40° C., and has an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in temperature variance measurement of dynamic viscoelasticity, divided by the number of parts by mass of the softener relative to 100 parts by mass of the polymer component, so that the rubber composition is high in maintainability of a coefficient of friction and wear resistance. A rubber layer of a paper feed roll can be formed of the rubber composition according to the present embodiment to provide a paper feed roll excellent in maintainability of a coefficient of friction and wear resistance, resulting in realizing long term stability of performance for paper separation feeding of the paper feed roll with respect to diversified various types of paper. Here, the phrase "a paper feed roll is excellent in maintainability of a coefficient of friction" means that the paper feed roll retains a predetermined coefficient of friction even after delivering a predetermined number of sheet materials such as paper, and the phrase "a paper feed roll is excellent in wear resistance" means that the paper feed roll retains a predetermined outer diameter even after delivering a predetermined number of sheet materials such as paper.

The rubber composition according to the present embodiment preferably has a 30% Mod (−40° C.) of less than or equal to 0.80 MPa, an E1 (22° C.)/number of parts by mass of softener of greater than or equal to 0.008 MPa/phr, and a T(tan δmax) of less than or equal to −50° C., the T(tan δmax) representing a temperature at which a loss tangent tan δ exhibits a maximum value (tan δmax) in the temperature variance measurement of dynamic viscoelasticity, from a view point of more increasing the maintainability of a coefficient of friction and the wear resistance.

In the rubber composition according to the present embodiment, the characteristics of the 30% Mod (−40° C.) can be replaced by the characteristics of E1 (−30° C.) as a dynamic modulus of elasticity at −30° C. in the temperature variance measurement of dynamic viscoelasticity. A characteristic value of less than or equal to 0.94 MPa for the 30% Mod (−40° C.) can be replaced by a characteristic value of less than or equal to 4.2 MPa for the E1 (−30° C.). That is, it is possible to obtain a rubber composition high in maintainability of a coefficient of friction and wear resistance even when the rubber composition according to the present embodiment is interpreted as having an E1 (−30° C.) of less than or equal to 4.2 MPa and having an E1 (22° C.)/number of parts by mass of softener of greater than or equal to 0.008 MPa/phr. Generally, measurement of the E1 (−30° C.) that is more easily performed than measurement of the 30% Mod (−40° C.) is useful for evaluating characteristics of the rubber composition.

The rubber composition according to the present embodiment preferably has an E1 (−30° C.) of less than or equal to 3.8 MPa and a T(tan δmax) of less than or equal to −50° C., the T(tan δmax) representing a temperature at which the loss tangent tan δ exhibits the maximum value (tan δmax) in the temperature variance measurement of dynamic viscoelasticity, from a view point of more increasing the maintainability of a coefficient of friction and the wear resistance.

The rubber composition according to the present embodiment preferably has a dynamic modulus of elasticity at 22° C. E1 (22° C.) of greater than or equal to 0.4 MPa and less than or equal to 2.1 MPa. The rubber composition having an E1 (22° C.) of less than or equal to 2.1 MPa can secure a sufficient contact area between the paper feed roll and a sheet material to give a high coefficient of friction suitable for the paper feed roll. The rubber composition having an E1 (22° C.) of more than 2.1 MPa reduces the contact area between the paper feed roll and a sheet material not to allow the securement of a sufficiently high coefficient of friction. The rubber composition having an E1 (22° C.) of less than 0.4 MPa sometimes causes a decrease in wear resistance of the rubber layer of the paper feed roll.

The rubber composition according to the present embodiment that has the characteristics described above is not particularly limited but preferably has the following components and composition.

<Polymer Component>

The polymer component may be a rubber material, preferably contains an EPDM, more preferably contains an EPDM as a main component. Here, the phrase "containing an EPDM as a main component" means that the polymer component contains greater than or equal to 80% by mass of the EPDM. With the EPDM accounting for less than 80% by mass of the polymer component, advantages are weakened that are features of the EPDM of being cheap and excellent in weather resistance, and it becomes difficult to enhance co-cross-linkability with a rubber material other than the EPDM, thus possibly decreasing the physical properties of the rubber composition, such as wear resistance, that is obtained by blending. The polymer component may contain, as the rubber material other than the EPDM, at least one of, for example, natural rubber, isoprene rubber, butadiene rubber, butyl rubber, styrene-butadiene rubber, polynorbornene rubber, butadiene-nitrile rubber, chloroprene rubber, halogenated butyl rubber, acrylic rubber, and epichlorohydrin rubber. When the EPDM is used as the polymer component, the EPDM may be a non oil-extended grade EPDM, an oil-extended grade EPDM, or one obtained by mixing a non oil-extended grade EPDM with an oil-extended grade EPDM.

The EPDM to be a component of the rubber composition according to the present embodiment preferably contains greater than or equal to 52% by mass and less than or equal to 70% by mass of an ethylene component unit. With the content of the ethylene component unit less than 52% by mass, a decrease in wear resistance is sometimes caused in the rubber layer of the paper feed roll. On the other hand, with the content of the ethylene component unit more than 70% by mass, the 30% Mod (−40° C.) increases to decrease the maintainability of a coefficient of friction, sometimes making it difficult to secure a necessary coefficient of friction after supply of paper. From the viewpoints described above, the content of the ethylene component unit is more preferably greater than or equal to 52% by mass and less than or equal to 67% by mass.

The EPDM to be a component of the rubber composition according to the present embodiment preferably contains greater than or equal to 2.8% by mass and less than or equal to 5.5% by mass of a diene component unit. With the content of the diene component unit less than 2.8% by mass, less cross-linking points are given when cross-linking is performed with sulfur, not sometimes giving, in a vulcanization process, a roll sample having a desired shape, and even when vulcanization molding is practicable, the rubber layer of the paper feed roll obtained by application of the vulcanization molded product sometimes causes a decrease in wear resistance or a decrease in compression set characteristics. On the other hand, with the content of the diene component unit more than 5.5% by mass, the 30% Mod (−40° C.) increases to decrease the maintainability of a coefficient of friction, sometimes making it difficult to secure a necessary coefficient of friction after supply of paper. From the viewpoints described above, the content of the diene component unit is more preferably greater than or equal to 2.8% by mass and less than or equal to 4.8% by mass. Here, the diene component unit contained in the EPDM is not particularly limited but may be, for example, ethylidene norbornene (hereinafter, also described as "ENB"), 1,4-hexadiene, or dicyclopentadiene, and is preferably ethylidene norbornene.

The polymer component of the rubber composition according to the present embodiment may contain only one EPDM or may contain two or more EPDMs. When the polymer component contains two or more EPDMs, the content of the ethylene component unit is evaluated as an average value calculated from the content rates of the EPDMs, specifically, evaluated as a total value of products of the EPDMs' characteristic values and their content rates. That is, when two or more EPDMs are used in combination, an EPDM satisfying the above characteristic value may be mixed with an EPDM not satisfying the above characteristic value.

<Softener>

The softener to be a component of the rubber composition according to the present embodiment is not particularly limited but preferably has a kinematic viscosity at 40° C. of greater than or equal to 10 mm$^2$/s and less than or equal to 60 mm$^2$/s. The softener having a kinematic viscosity of less than 10 mm$^2$/s causes the rubber composition to bleed, sometimes causing a decrease in coefficient of friction and dirt on a sheet. The softener having a kinematic viscosity of more than 60 mm$^2$/s increases the 30% Mod (−40° C.) to decrease the maintainability of a coefficient of friction, sometimes making it difficult to secure a necessary coefficient of friction after supply of paper. The softener that satisfies such a kinematic viscosity is not particularly limited but is preferably a paraffin-based petroleum blended oil having small contents of a naphthene component and an aromatic component, a poly-α-olefin, or a long-chain alkyl carbonate.

The softener is more preferably a poly-α-olefin or a long-chain alkyl carbonate each having a kinematic viscosity at 40° C. of greater than or equal to 10 mm$^2$/s and less than or equal to 30 mm$^2$/s. When the polymer component contains an extender oil, the softener may be the extender oil contained in the polymer component.

The rubber composition according to the present embodiment may contain only one softener or two or more softeners. When the rubber composition contains two or more softeners, the kinematic viscosity at 40° C. of the softeners is evaluated as an average value calculated from the content rates of the softeners, specifically, evaluated as a total value of products of the softeners' kinematic viscosities at 40° C. and their content rates. That is, when two or more softeners are used in combination, a softener having a kinematic viscosity within the above range may be mixed with a softener having a kinematic viscosity outside the above range.

The rubber composition according to the present embodiment preferably contains greater than or equal to 45 parts by mass and less than or equal to 110 parts by mass of the softener relative to 100 parts by mass of the polymer component. With the blending amount of the softener less than 45 parts by mass, the 30% Mod (−40° C.) increases to decrease the maintainability of a coefficient of friction, sometimes making it difficult to secure a necessary coefficient of friction after supply of paper. With the blending amount of the softener more than 110 parts by mass, the E1 (22° C.)/number of parts by mass of softener decreases to sometimes cause a decrease in wear resistance. From the viewpoints described above, the blending amount of the softener is more preferably greater than or equal to 45 parts by mass and less than or equal to 100 parts by mass relative to 100 parts by mass of the polymer component. In the meantime, when the polymer component contains an extender oil, the mass of the extender oil is regarded as the blending amount by mass of the softener.

<Cross-Linking Agent>

The cross-linking agent is not particularly limited and examples of the cross-linking agent include sulfur, sulfur organic compounds such as tetraalkylthiuram disulfide, metal compounds such as magnesium oxide, an organic peroxide, and a resin cross-linking agent. Among these, it is preferable to use sulfur that is cheap, easily available, and excellent in wear resistance.

The blending amount of the cross-linking agent is not particularly limited but is preferably greater than or equal to 1 part by mass and less than or equal to 2.8 parts by mass relative to 100 parts by mass of the polymer component when sulfur is used. With the blending amount of sulfur less than 1.0 part by mass, the rubber layer of the paper feed roll sometimes causes a decrease in wear resistance and a decrease in compression set characteristics. With the blending amount of sulfur more than 2.8 parts by mass, the 30% Mod (−40° C.) increases to decrease the maintainability of a coefficient of friction, sometimes making it difficult to secure a necessary coefficient of friction after supply of paper.

<Vulcanization Accelerator>

When the rubber composition according to the present embodiment contains sulfur as the cross-linking agent, the rubber composition preferably contains a vulcanization accelerator. The vulcanization accelerator is not particularly limited and examples of the vulcanization accelerator include thiazoles such as dibenzothiazyl disulfide, sulfenamides such as N-cyclohexyl-2-benzothiazole sulfenamide, thiurams such as tetramethylthiuram disulfide, and dithiocarbamates such as zinc dimethyldithiocarbamate. These materials may be used alone or in combination of two or more of these materials. The blending amount of the vulcanization accelerator is not particularly limited and may be set appropriately.

<Vulcanization Accelerator Aid>

The rubber composition according to the present embodiment may contain a vulcanization accelerator aid. The vulcanization accelerator aid can be appropriately selected, depending on the cross-linking system, from publicly know substances including metal oxides such as zinc white, fatty acids such as stearic acid and oleic acid, and zinc stearate. The blending amount of the vulcanization accelerator aid is not particularly limited and may be set appropriately.

<Anti-Scorching Agent>

The rubber composition according to the present embodiment may contain an anti-scorching agent. Examples of the anti-scorching agent include publicly known maleic anhydride, a thioimine compound, a sulfenamide compound, and a sulfonamide compound. The blending amount of the anti-scorching agent is not particularly limited and may be set appropriately, but the blending amount is preferably less than or equal to 3 parts by mass relative to 100 parts by mass of the polymer component.

<Filler>

The rubber composition according to the present embodiment can contain a filler as necessary. The filler is not particularly limited and may be carbon black, silica, calcium carbonate, magnesium carbonate, aluminum hydroxide, clay, talc, diatom earth, mica, a wood chip, or cork, or may be a fiber formed of straw, bamboo, a metal, glass or a polymer. These fillers may be used alone or in mixture.

The blending amount of the filler is not particularly limited. Use of carbon black, however, blackens the rubber composition, and use of the carbon black-containing rubber composition for the rubber layer of the paper feed roll sometimes causes a slip mark of the paper feed roll to be left on paper when a slip is generated between the paper feed roll and the paper, so that the blending amount of carbon black is preferably set to less than or equal to 3 parts by mass relative to 100 parts by mass of the polymer component. When a filler other than carbon black is used, the blending amount of the filler is preferably less than or equal to 10 parts by mass, more preferably less than or equal to 5 parts by mass, relative to 100 parts by mass of the polymer component. With the blending amount of the filler more than 10 parts by mass, it becomes difficult to increase the E1 (22° C.)/number of parts by mass of softener and thus enhance the wear resistance, while setting the E1 (22° C.) to less than or equal to 2.1 MPa to secure a sufficient contact area between the paper feed roll and a sheet material and thus give a high coefficient of friction suitable for the paper feed roll.

<Anti-Aging Agent>

The rubber composition according to the present embodiment can contain an anti-aging agent as necessary. In this case, examples of the anti-aging agent to be used include an amine anti-aging agent, a phenol anti-aging agent, and a sulfur anti-aging agent. The blending amount of the anti-aging agent is not particularly limited.

Here, the foregoing design principle for blending in the present invention is described in detail. The viscoelastic characteristics of rubber have been known as an important factor that affects friction characteristics and the wear resistance. Conventional material development from a viewpoint of the viscoelastic characteristics, however, has mainly focused on the viscoelastic characteristics in a frequency domain (1 Hz to several hundred Hz) corresponding to one distortion per rotation of the paper feed roll in, for example, office automation equipment. Controlling the viscoelastic characteristics in a temperature range at which office automation equipment is normally used and in a frequency domain of 1 Hz to several hundred Hz has exhibited an effect of improving an initial (before supply of paper) coefficient of friction and initial wear resistance to some extent but has been incapable of giving a sufficient effect of improving the maintainability of a coefficient of friction. Therefore, the inventor of the present invention has assumed that generated on the paper feed roll is not only a vibration at a frequency corresponding to one distortion per rotation of the roll but also a vibration in a higher frequency domain (several hundred Hz to several million Hz), and the viscoelastic characteristics in this high frequency domain affect the maintainability of a coefficient of friction, and the inventor of the present invention has applied an idea of a publicly known time-temperature law. Then, the inventor of the present invention has replaced the viscoelastic characteristics in a high frequency domain by the viscoelastic characteristics in a low temperature region and proposed that it is possible to provide a paper feed roll excellent in maintainability of a coefficient of friction by configuring the rubber layer of the paper feed roll using the rubber composition having a tan δmax of less than or equal to 1.1, the tan δmax representing the viscoelastic characteristics in a low temperature region, having a T(tan δmax) of less than or equal to −40° C., and having an E1 (22° C.) of less than or equal to 2.1 MPa, the E1 (22° C.) representing a dynamic modulus of elasticity at 22° C. as a room temperature region, in temperature variance measurement of dynamic viscoelasticity (PTL 4).

Studies of the inventor of the present invention after application of PTL 4 has come to clarify that even when the conditions of claim 1 in PTL 4 are satisfied, high maintainability of a coefficient of friction cannot always be obtained as illustrated in FIG. 5. This suggests that for the maintainability of a coefficient of friction, another more influential physical property parameter exists as a controlling factor, in addition to the tan δmax, the T(tan δmax), and the E1 (22° C.) described in PTL 4.

Figure 6:
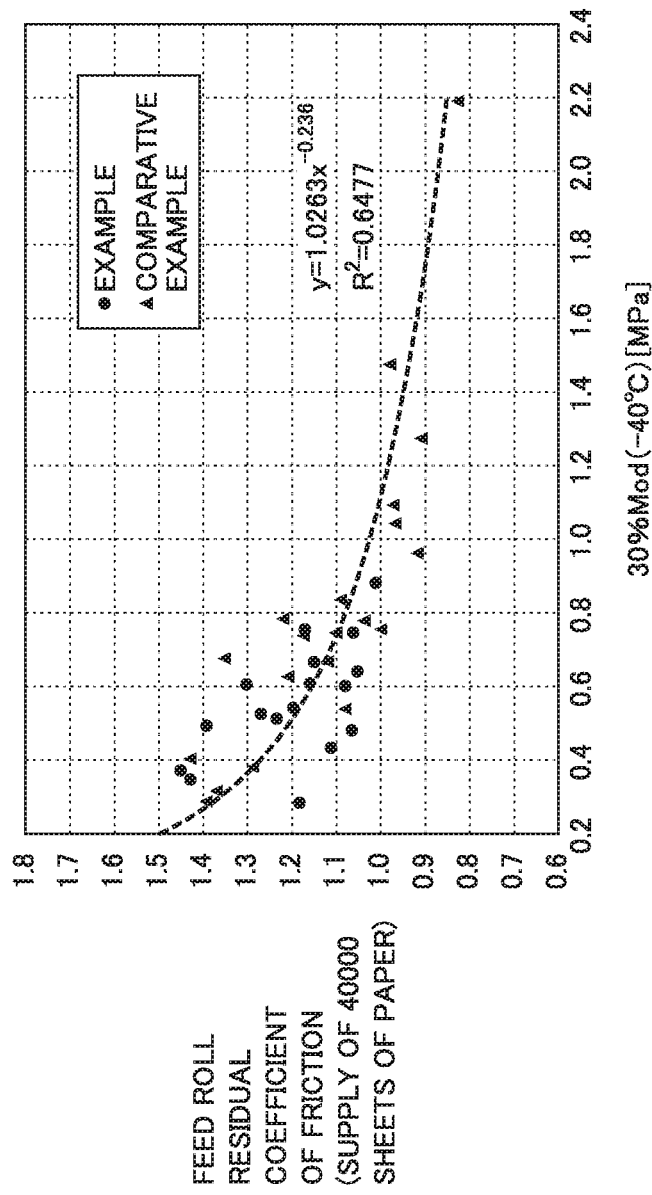
FIG. 6 is a graph illustrating the dependency of the residual coefficient of friction on 30% Mod (−40° C.) in feed rolls.

Therefore, the inventor of the present invention has earnestly struggled to reveal the factor that controls the maintainability of a coefficient of friction and is other than the tan δmax, the T(tan δmax), and the E1 (22° C.) to find as a result that the physical property parameter is the 30% Mod (−40° C.) as illustrated in FIG. 6. Here, described in detail is a physical meaning of this new physical property parameter 30% Mod (−40° C.).

As described above, PTL 4 has considered that generated on a surface of the rubber layer of the paper feed roll is not only a vibration at a frequency corresponding to one distortion per rotation of the roll but also a vibration in a higher frequency domain (several hundred Hz to several million Hz), and the viscoelastic characteristics in this high frequency domain is a controlling factor of the coefficient of friction. The viscoelastic characteristics referred to herein, however, are ones obtained by evaluating responsiveness to low strain (about 0.02% of dynamic strain) according to the definition "the dynamic viscoelasticity experiment is an experiment of quantitatively examining strain or a state of stress generated on an object when stress or strain that sinusoidally varies with small amplitude is applied to the object.

The inventor of the present invention, however, has assumed from the results of the studies after application of PTL 4 that although generated on a surface of the rubber layer of the paper feed roll during feeding of paper is not only a vibration at a frequency corresponding to one distortion per rotation of the roll but also a vibration in a higher frequency domain (several hundred Hz to several million Hz) as described in PTL 4, the strain of the vibration is not low strain of around 0.02% as in the viscoelasticity measurement described above but high strain of several % to several hundred %. Then, with application of the idea of the time-temperature law, the vibration (distortion) at a high frequency is converted into a distortion at low temperature and a tensile test has been performed with the temperature and strain (elongation) varied.

The test result has not identified the frequency and the strain of a vibration actually generated on the surface of the paper feed roll. As illustrated in FIG. 6, however, the inventor of the present invention has found that the 30% Mod (−40° C.) is an influential factor for the maintainability of a coefficient of friction, the 30% Mod (−40° C.) representing a modulus in 30% elongation when the tensile test is performed at −40° C. and 1.1 mm/sec, and the residual coefficient of friction on a feed roll 10F increases according as the 30% Mod (−40° C.) is smaller. That is, repetitive distortions occur on the surface of the rubber layer of the paper feed roll during feeding of paper, the distortions occurring in a higher frequency domain (several hundred Hz to several million Hz) than the frequency corresponding to one distortion per rotation of the roll and occurring with respect to larger strain than strain applied in measuring the dynamic viscoelasticity by a normal viscoelasticity measuring apparatus. It is assumed that when these distortions occur more easily (the modulus with respect to large strain is smaller), the maintainability of a coefficient of friction increases.

Figure 7:
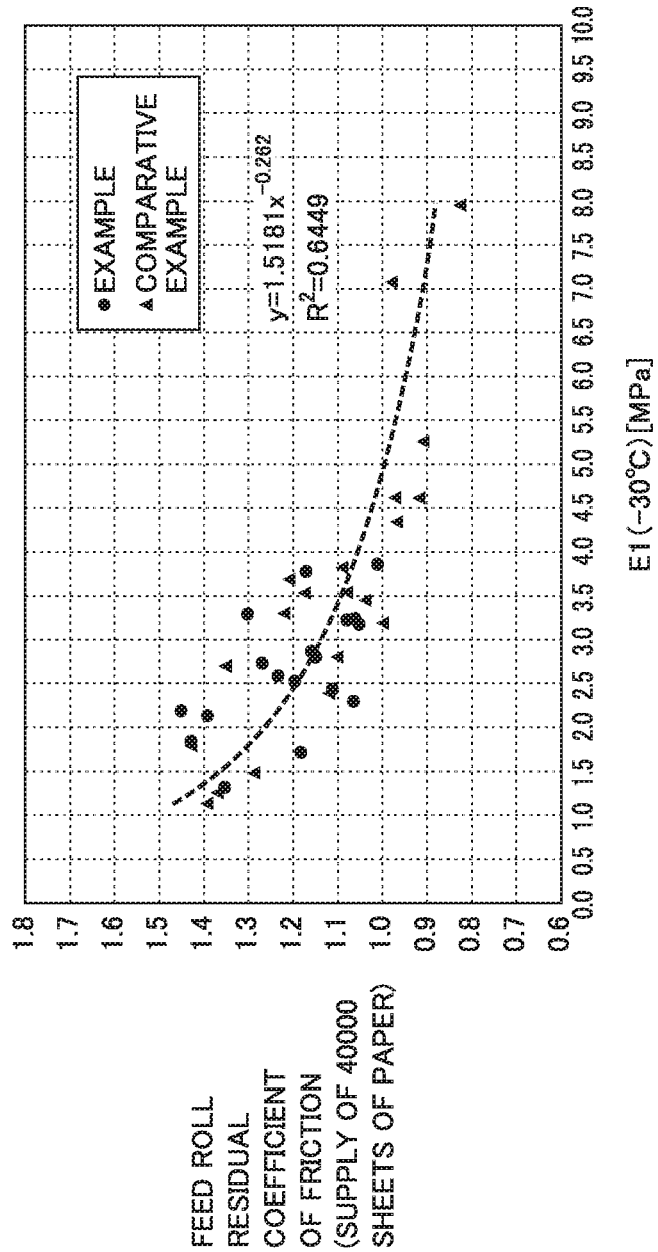
FIG. 7 is a graph illustrating the dependency of the residual coefficient of friction on E1 (−30° C.) in feed rolls.

Depending on the blending or the measuring apparatus, it is sometimes impossible to accurately measure the 30% Mod (−40° C.) due to generation of problems such as fracture, chuck slipping, and exceeding capacity of a load cell when measuring the 30% Mod (−40° C.). In this case, as regards a relationship with the residual coefficient of friction on feed roll 10F, the 30% Mod (−40° C.) can be approximately replaced by the E1 (−30° C.) (dynamic modulus of elasticity E1 at a measurement temperature of −30° C.) as illustrated in FIG. 7. That is, 30% Mod (−40° C.) 0.94 MPa can be interpreted as E1 (−30° C.) 4.2 MPa, and 30% Mod (−40° C.) 0.80 MPa as E1 (−30° C.) 3.8 MPa.

Assuming that a distortion occurs on the surface of the paper feed roll with respect to high-speed large strain, the distortion comes to repetitively occur during feeding of paper, and it is assumed that when loss (such as friction between polymer main chains, between a polymer main chain and a filler, or between fillers) in rubber caused by this distortion is smaller, rubber fatigue is smaller, leading to long term stability of the characteristics. In that meaning, in order to enhance the maintainability of a coefficient of friction over a long period, in combination with the 30% Mod (−40° C.) that is to be small, the T(tan δmax) is preferably lower, specifically, the T(tan δmax) is preferably less than or equal to −50° C.

Next, another problem to be solved in the present application, improvement of the wear resistance has been examined while the 30% Mod (−40° C.) is regarded as a controlling factor for the maintainability of a coefficient of friction. The polymer containing an EPDM as a main component is generally said to improve the wear resistance by increasing the content of an ethylene component unit and the content of a diene component unit in the EPDM.

Figure 8:
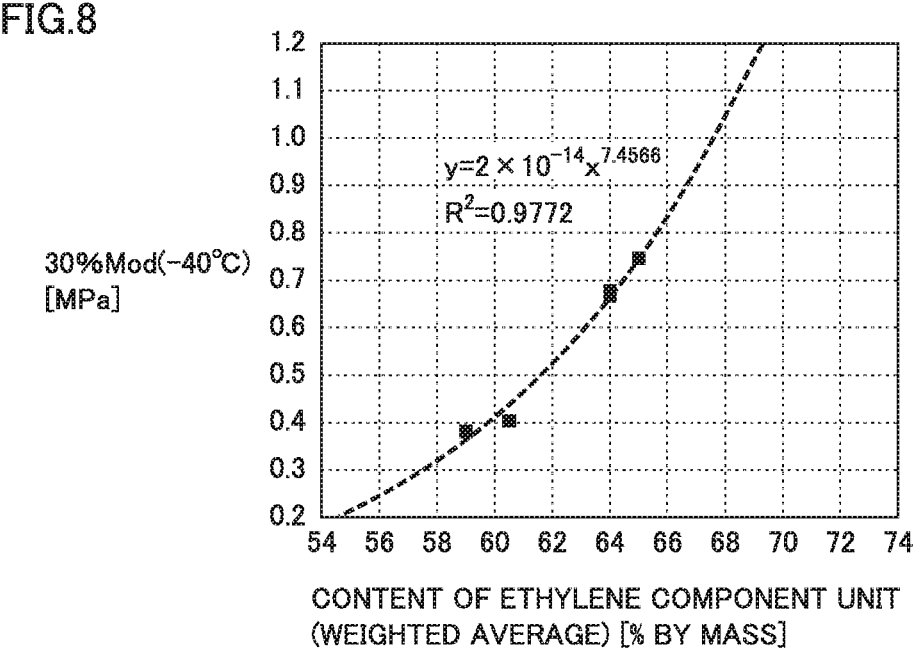
FIG. 8 is a graph illustrating the dependency of the 30% Mod (−40° C.) on the content of an ethylene component unit.
Figure 9:
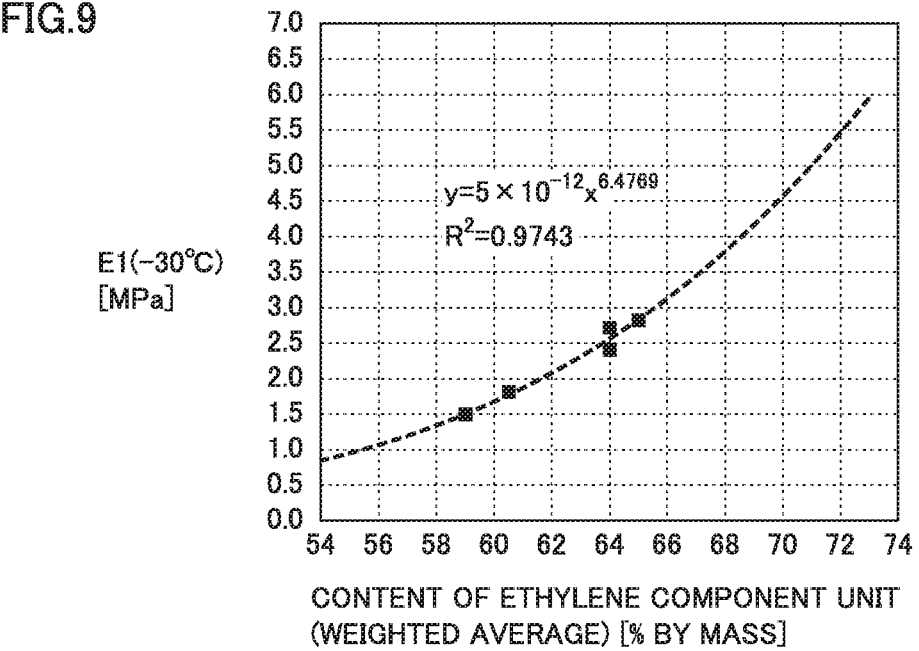
FIG. 9 is a graph illustrating the dependency of the E1 (−30° C.) on the content of the ethylene component unit.
Figure 10:
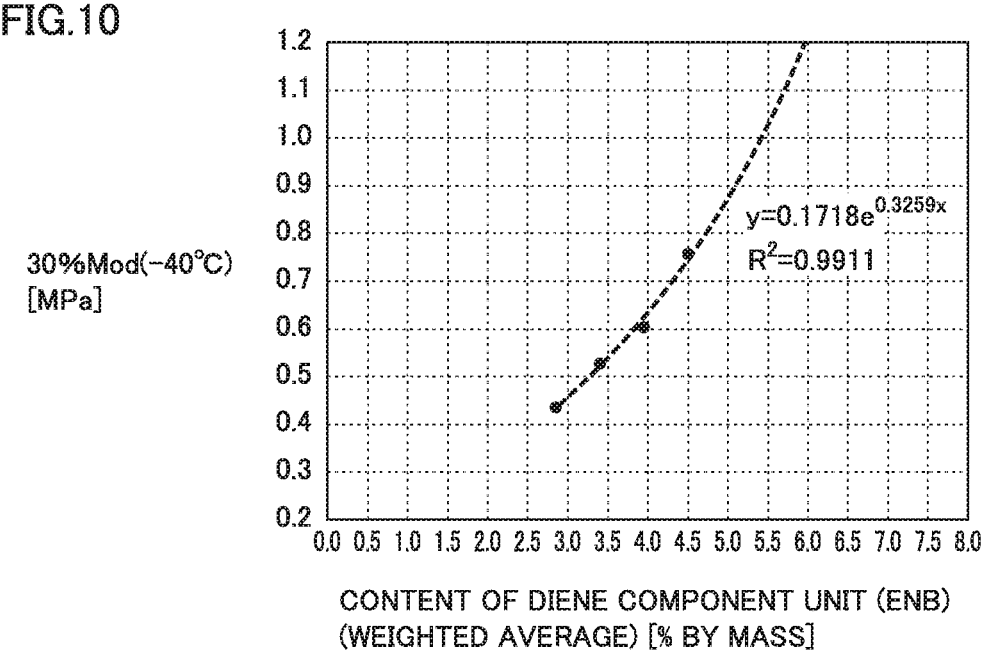
FIG. 10 is a graph illustrating the dependency of the 30% Mod (−40° C.) on the content of a diene component unit.
Figure 11:
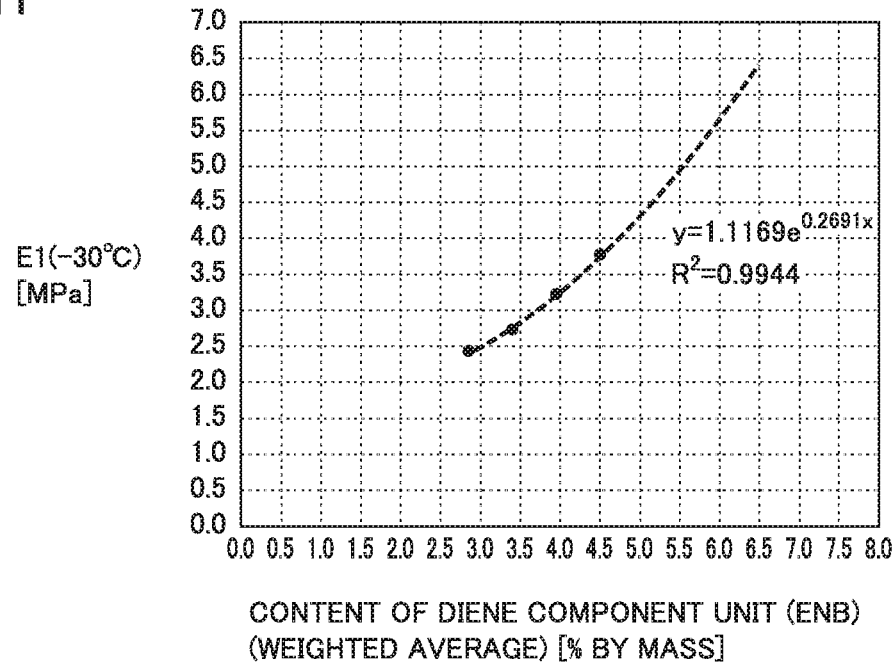
FIG. 11 is a graph illustrating the dependency of the E1 (−30° C.) on the content of the diene component unit.

An increase in content of the ethylene component unit in the EPDM, however, tends to increase the 30% Mod (−40° C.) as illustrated in FIG. 8 as well as the E1 (−30° C.) as illustrated in FIG. 9. An increase in content of the diene component unit (for example, ENB (ethylidene norbornene)) in the EPDM also tends to increase the 30% Mod (−40° C.) as illustrated in FIG. 10 as well as the E1 (−30° C.) as illustrated in FIG. 11.

Accordingly, improvement in wear resistance of the EPDM as a simple substance leads to an increase in 30% Mod (−40° C.) and E1 (−30° C.), that is, a tendency of decreasing the maintainability of a coefficient of friction, and only increasing and decreasing the content of the ethylene component unit and/or the content of the diene component unit in the EPDM cannot attain the object of the present application, achievement of both high maintainability of a coefficient of friction and high wear resistance.

Figure 12:
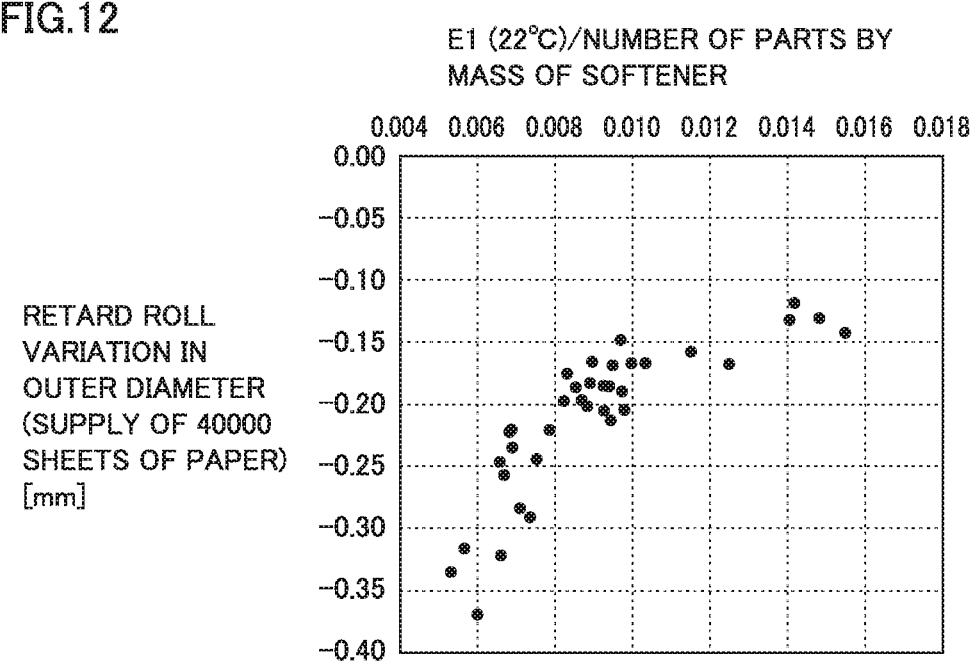
FIG. 12 is a graph illustrating the dependency of variation in outer diameter of a retard roll that has undergone a 40000-sheet paper supply test, on E1 (22° C.)/number of parts by mass of softener.

On the other hand, when the wear resistance of the rubber composition is checked from a viewpoint of the blending amount of the softener, the rubber composition containing the softener tends to exhibit, as illustrated in FIG. 12, higher wear resistance of a retard roll 10R (smaller absolute value of the variation in outer diameter of the rubber layer) as the E1 (22° C.) (dynamic modulus of elasticity E1 at a measurement temperature of 22° C.) per part by mass of the softener is larger. Accordingly, a smaller blending amount of the softener increases the wear resistance but only reducing the blending amount of the softener naturally leads to a rise in hardness and a rise in 30% Mod (−40° C.) to decrease the initial coefficient of friction and the initial maintainability of a coefficient of friction.

Figure 13:
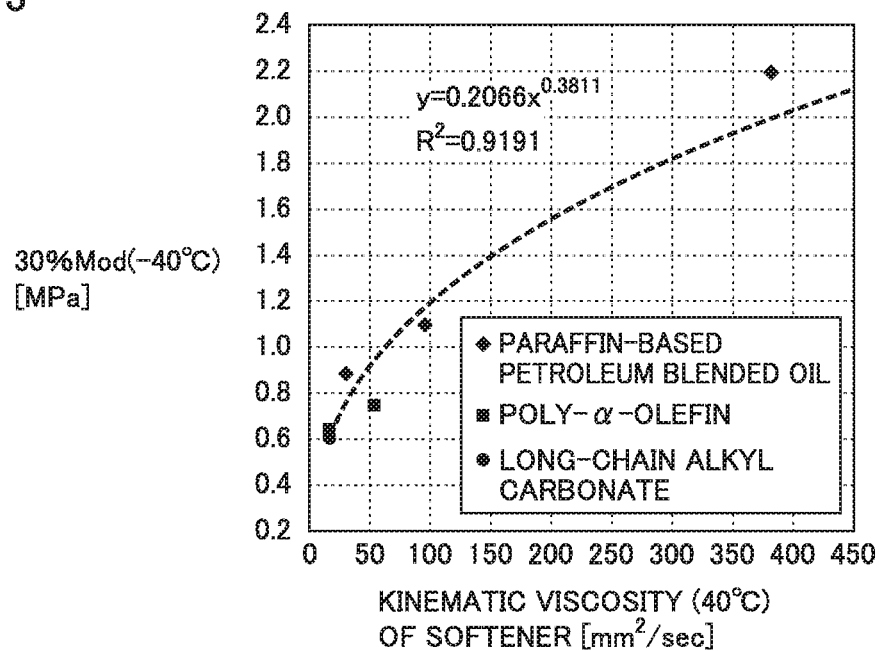
FIG. 13 is a graph illustrating the dependency of the 30% Mod (−40° C.) on kinematic viscosity of a softener.
Figure 14:
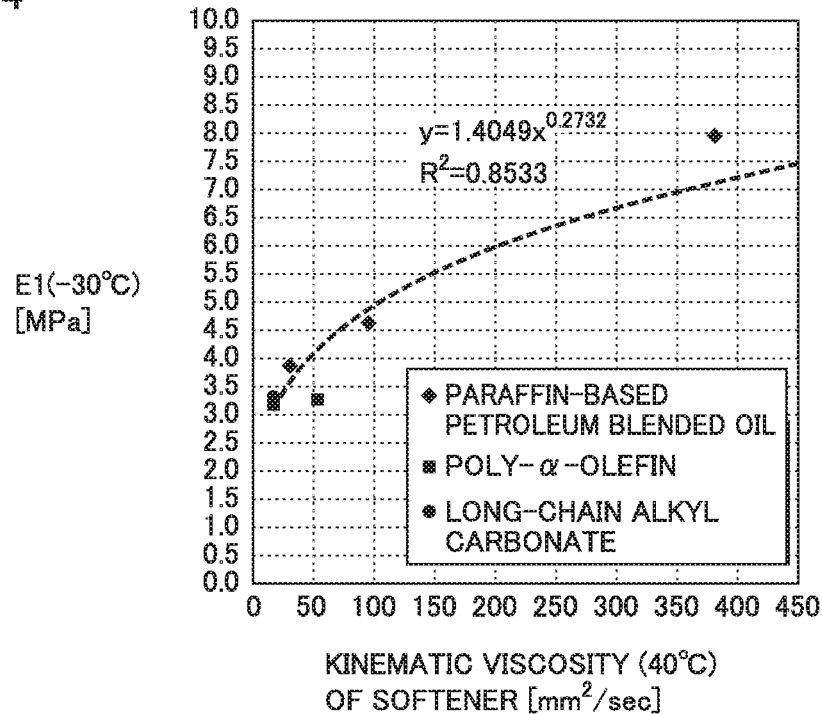
FIG. 14 is a graph illustrating the dependency of the E1 (−30° C.) on the kinematic viscosity of the softener.

Here, when the kinematic viscosity of the softener is focused, the 30% Mod (−40° C.) and the E1 (−30° C.) show, as illustrated in FIGS. 13 and 14, a tendency to become smaller as the kinematic viscosity of the softener is lower. Accordingly, use of the softener having a low kinematic viscosity is assumed to be capable of decreasing the 30% Mod (−40° C.) and the E1 (−30° C.) with a smaller amount than in the case of using the softener having a high kinematic viscosity.

Figure 15:
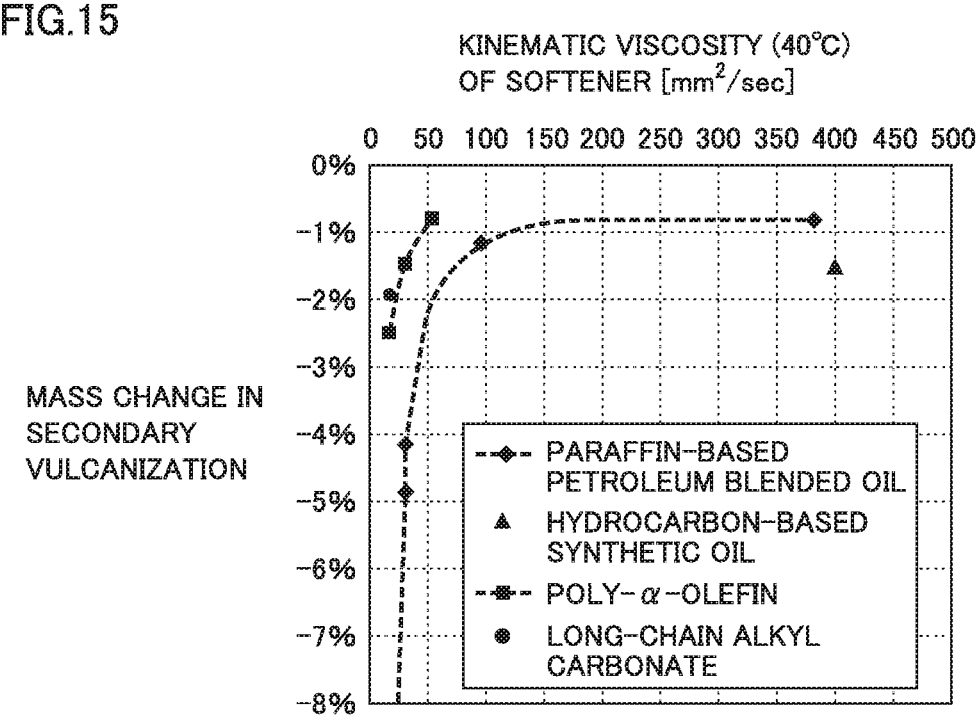
FIG. 15 is a graph illustrating the dependency of mass change of the softener at secondary vulcanization on the kinematic viscosity of the softener.

The softener having a kinematic viscosity at 40° C. of less than 10 mm$^2$/s, however, has a possibility of bleeding, so that the softener desirably has a kinematic viscosity of greater than or equal to 10 mm$^2$/s. Even when the kinematic viscosity of the softener is set to greater than or equal to 10 mm$^2$/s, however, in order to control dirt on a sheet caused by bleeding from the paper feed roll, it is preferable to perform a secondary vulcanization (revulcanization) on a vulcanization molded rubber roll at a temperature of 140° C. to 190° C. for about 30 min to 180 min for removal of a low-molecular component that can be a substance responsible for the bleeding. In the case of a normal paraffin-based petroleum blended oil, however, a decrease in kinematic viscosity increases volatilization volume in the secondary vulcanization as illustrated in FIG. 15. An increase in volatilization volume during the secondary vulcanization sometimes causes the case of not giving physical properties expected from the blending amount of the softener in the blending composition (for example, giving a larger value for the 30% Mod (−40° C.) than a value expected from the blending amount of the softer in the blending composition) or the case of causing remarkable contraction of a rubber cot not to give a desired shape of the rubber cot.

Accordingly, the softener is preferable that is low in kinematic viscosity and small in mass change (that is, small in volatilization volume) in the secondary vulcanization. Examples of the softener having such characteristics include a poly-α-olefin (hereinafter, also described as PAO) and a long-chain alkyl carbonate as illustrated in FIG. 15.

Thus, in order to allow the rubber composition according to the present embodiment to exert the characteristics described above, the design principle for blending is made as: when the polymer contains an EPDM as a main component, the contents of the ethylene component unit is suppressed to less than or equal to 70% by mass and/or the diene component unit is suppressed to less than or equal to 5.5% by mass, the units improving the wear resistance of the EPDM as a simple substance when increased in content, and the softener having a low kinematic viscosity is used, for compensation of the suppression, to decrease the number of parts by mass of the softener necessary for decreasing the 30% Mod (−40° C.) and the E1 (−30° C.) to the predetermined values and thus increase the E1 (22° C.)/number of parts by mass of softener [MPa/phr]. In the principle, it is necessary to find an optimal balance point among the contents of the ethylene component unit and the diene component unit (for example, ENB) in the EPDM and the kinematic viscosity and the blending amount of the softener.

The EPDM to be a component of the rubber composition according to the present embodiment preferably has a mooney viscosity ML 1+4 (125° C.) of greater than or equal to 50 and less than or equal to 120. Here, the mooney viscosity ML 1+4 (125° C.) is measured in accordance with JIS K-6300-1: 2013, at a test temperature of 125° C., with preheating time of an L-shaped rotor set to 1 minute and rotation time of the rotor set to 4 minutes. The EPDM having a mooney viscosity ML 1+4 (125° C.) of greater than or equal to 50 has a sufficiently large polymer molecular weight and allows the wear resistance to be sufficiently secured. On the other hand, the EPDM having a mooney viscosity ML 1+4 (125° C.) of less than or equal to 150 has an advantage of giving excellent processability. Here, the ML 1+4 (125° C.) means a value measured at a state where an extender oil is removed when an oil-extended grade EPDM is used.

With the 30% Mod (−40° C.) set to less than or equal to 0.94 MPa, it is possible to increase the residual coefficient of friction of the paper feed roll after supply of paper. Here, the 30% Mod (−40° C.) is more preferably less than or equal to 0.8 MPa and the T(tan δmax) is more preferably less than or equal to −50° C. A reason why the T(tan δmax) is preferably less than or equal to −50° C. with the stipulation for the 30% Mod (−40° C.) is based on an idea that with the T(tan δmax) less than or equal to −50° C., an inner loss, that is, rubber fatigue is small when the rubber layer on the surface of the paper feed roll is repetitively distorted with respect to high-speed large strain, to give an advantage to the long term stability of the characteristics.

With the E1 (−30° C.) set to less than or equal to 4.2 MPa, it is possible to increase the residual coefficient of friction of the paper feed roll after supply of paper. Here, the E1 (−30° C.) is more preferably less than or equal to 3.8 MPa and the T(tan δmax) is more preferably less than or equal to −50° C.

With the E1 (22° C.)/number of parts by mass of softener set to greater than or equal to 0.008 MPa/phr, it is possible to increase the wear resistance and suppress the variation in outer diameter of the paper feed roll.

<Method of Manufacturing Rubber Composition>

The rubber composition according to the present embodiment can be manufactured by kneading, with publicly known kneading equipment such as a kneader or an open roll, a blended product formed of predetermined amounts of a polymer component, a softener, and a cross-linking agent, and predetermined amounts of additives blended as necessary, such as a filler, another vulcanization accelerator, a vulcanization accelerator aid, an anti-scorching agent, and an anti-aging agent to give an unvulcanized rubber composition, and subjecting the unvulcanized rubber composition to vulcanization molding under predetermined heating conditions. As a method of vulcanization molding the rubber composition, there can be exemplified extrusion molding and transfer molding. For example, the unvulcanized rubber composition is introduced into a predetermined mold for transfer molding and subjected to vulcanization (primary vulcanization) at a temperature of 140° C. to 180° C. for about 5 minutes to 30 minutes to simultaneously perform cross-linking of the rubber composition and molding the rubber composition into a tube shape. The molded tube may be subjected to secondary vulcanization as necessary at a temperature of 140° C. to 190° C. for about 30 minutes to 180 minutes. Such secondary vulcanization can volatilize a low-molecular component that easily bleeds. Thereafter, the molded rubber tube can be polished with, for example, a cylindrical grinder to give a desired outer diameter and cut at a desired length to give a cross-linked rubber composition having a shape suitable for a paper feed roll.

Embodiment 2: Paper Feed Roll

A paper feed roll according to a present embodiment includes a rubber layer formed of the rubber composition according to Embodiment 1. Specifically, with reference to FIG. 16, a paper feed roll 10 according to the present embodiment is configured by inserting a shaft 12 into a rubber layer 11 formed of the rubber composition according to Embodiment 1 or by bonding both the members with an adhesive agent. Configurations other than the material for rubber layer 11 among the configurations of paper feed roll 10 may be configurations that are normally used as the configurations of paper feed roll 10, the configurations other than the material for the rubber layer including, for example, a shape of the paper feed roll (such as a cylindrical shape or a D-shape), a method of processing a surface (such as polishing, knurling, emboss processing, or patterning of recesses and protrusions), thickness of rubber layer 11, a material for shaft 12, and a diameter of shaft 12. Rubber layer 11 preferably constitutes an outermost layer of the roll that comes in contact with a sheet material. Such paper feed roll 10 is applicable as, for example, a pick-up roll 10P, a feed roll 10F, or a retard roll 10R in office automation equipment, an automated teller machine, or the like.

Examples

Hereinafter, the present invention is described in further detail with reference to examples. The present invention, however, is not limited to these examples.

<Production of Paper Feed Roll>

Figure 16:
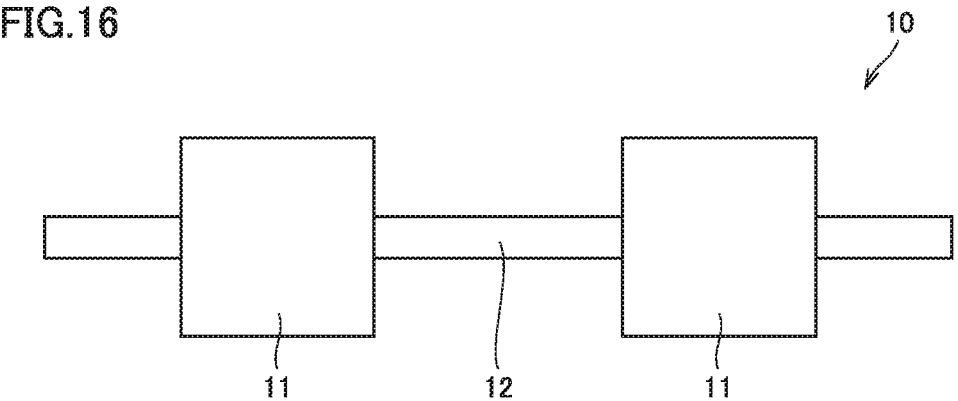
FIG. 16 is a schematic view illustrating a shape of a paper feed roll.

A paper feed roll 10 was produced that had a shape illustrated in FIG. 16. First, blending components shown in Tables 1 to 5 were kneaded using kneading equipment, subjected to vulcanization molding under the conditions of 160° C. for 30 minutes in a predetermined mold, and then further subjected to secondary vulcanization under the conditions of 160° C. for 60 minutes. These procedures gave a cylindrical rubber molded body for a paper feed roll having an outer diameter of 21 mm, an inner diameter of 9 mm, and a length of 50 mm. Next, this rubber molded body was fit to a core having a diameter of 10 mm and cut at a width of 10 mm. Next, with the cut rubber molded body regarded as a rubber layer 11, a polyacetal resin-made shaft 12 was inserted into the rubber layer as illustrated in FIG. 16. Next, a surface of rubber layer 11 is polished to give an outer diameter of 20 mm, and thus paper feed rolls 10 of the examples and comparative examples were produced that were formed of rubber layer 11 and shaft 12. The shape of rubber layer 11 that was polished had an outer diameter of 20 mm, an inner diameter of 10 mm, and a length of 10 mm.

<Measurement of Viscoelastic Characteristics>

Blending components shown in Tables 1 to 5 were kneaded using kneading equipment, subjected to vulcanization molding using a sheet-shaped mold under the conditions of 160° C. for 30 minutes, and further subjected to secondary vulcanization under the conditions of 160° C. for 60 minutes. These procedures gave a sheet-shaped rubber cross-linked product. A strip sample with width 5 mm×length 20 mm×thickness 2 mm was punched out from this sheet. The punched-out sample was measured for the viscoelastic characteristics (temperature variance) using a dynamic viscoelasticity measuring apparatus (Rheogel E4000FHP manufactured by UBM) under the measurement conditions described below.

Measurement temperature: −84° C. to 120° C.
Measurement temperature rise rate: 2° C./min
Temperature measuring interval: 1° C.
Measurement frequency: 10 Hz
Initial strain: 1.3 mm
Amplitude: 2 μm
Distortion mode: tension
Distance between chucks: 10 mm
Wave form: sine wave As regards the samples produced above, values of the dynamic moduli of elasticity E1 (−30° C.) and E1 (22° C.) were read from the measurement result, and the tan δmax and the T(tan δmax) were read from a graph illustrating a relationship between the temperature and the loss tangent tan δ obtained.

<Measurement of 30% Mod (−40° C.)>

Blending components shown in Tables 1 to 5 were kneaded using kneading equipment, subjected to vulcanization molding using a sheet-shaped mold under the conditions of 160° C. for 30 minutes, and further subjected to secondary vulcanization under the conditions of 160° C. for 60 minutes. These procedures gave a sheet-shaped rubber cross-linked product. A strip sample with width 5 mm×length 20 mm×thickness 2 mm was punched out from this sheet. The punched-out sample was measured for the 30% Mod (−40° C.) using a dynamic viscoelasticity measuring apparatus (Rheogel E4000FHP manufactured by UBM) under the measurement conditions described below.

Control of measurement temperature: lower temperature to less than or equal to −65° C. (greater than or equal to −75° C.) and afterward wait until temperature naturally rise to −40° C.±1° C.

Shape of sample: width 5 mm×thickness 2 mm×length (distance between chucks) 10 mm
Measurement mode: S-S measurement
Displacement setting value: 3.3 mm
Number of points read per second: 10

<Paper Supply Test>

Figure 17:
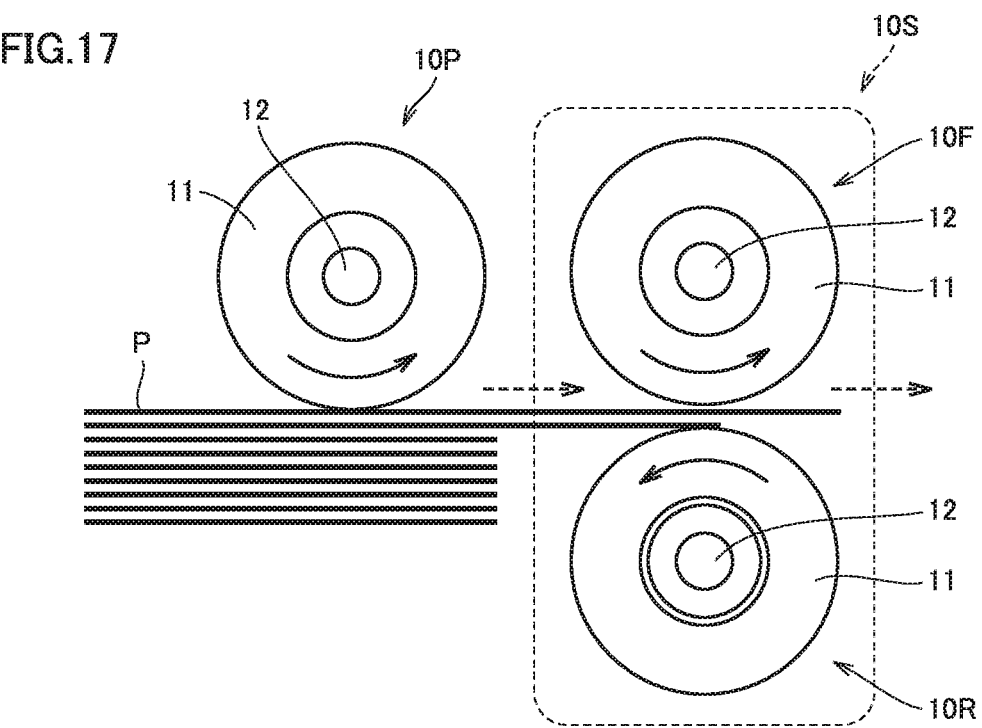
FIG. 17 is a schematic sectional view of a paper feeding mechanism involving the present invention.

Each of the paper feed rolls of the examples and the comparative examples was mounted in a color composite machine, DocuCentre C65501 (manufactured by Fuji Xerox Co., Ltd.), and paper "Xerox 4200" manufactured by Fuji Xerox Co., Ltd. was supplied to the paper feed roll. FIG. 17 illustrates a schematic sectional view of a paper feeding mechanism of the composite machine for a paper supply test. A paper feeding device is configured to include a sheet cassette having sheets (paper P) as sheet materials loaded thereon, a pick-up roll 10P that sends paper P out from the sheet cassette while coming in contact with a tip-side upper surface of paper P, and a separation mechanism 10S that separates sheets of paper P sent into from pick-up roll 10P one by one while delivering paper P downstream of pick-up roll 10P along a sheet delivery direction. Separation mechanism 10S is formed of a feed roll 10F as one example of a paper feeding roller, and a retard roll 10R that is disposed opposite to and in pressure contact with feed roll 10F under feed roll 10F and that is configured to include a rubber layer 11 and a torque limiter. Feed roll 10F is a drive roller that is rotationally driven by a drive source (not shown) around a shaft, with the shaft along a line perpendicular to a paper P delivery direction, and feed roll 10F comes in contact with an upper surface (surface) of paper P sent out from the sheet cassette and is rotationally driven to deliver paper P downstream (see dotted line arrows in the drawing). A nip part is formed between feed roll 10F and retard roll 10R and holds paper P sent out from the sheet cassette. When a plurality of sheets of paper P are delivered on top of one another to this nip part, the torque limiter included in retard roll 10R applies delivery resistance to a lower surface (back surface) of paper P to suppress overlap feed of paper P delivered by feed roll 10F. In order to promote evaluation, the paper supply test and measurement were performed in a normal room environment (for example, a temperature of 22° C. and a humidity of 55%) and under a comparative environment with a temperature of 10° C. and a humidity of 15% where paper power easily attaches to a paper feed roll by supply of paper. The paper supply test was started after the paper feed roll, measurement sheets, and the paper supply test machine were left under each of these environments for greater than or equal to 24 hours.

<Measurement of Coefficient of Friction μ>

Figure 18:
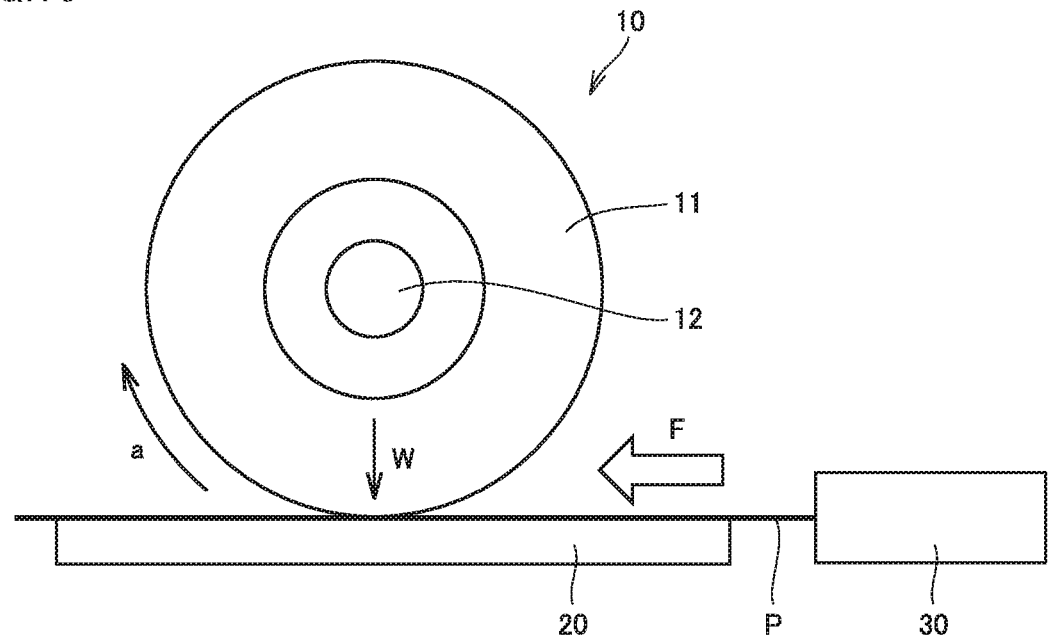
FIG. 18 is a schematic view illustrating a method of measuring a coefficient of friction.

A coefficient of friction μ is measured by a method illustrated in FIG. 18. The measurement of the coefficient of friction was performed under an environment with a temperature of 10° C. and a humidity of 15%. The measurement was started after the paper feed roll, measurement sheets, and a measurement jig were left under this environment for greater than or equal to 24 hours. Frist, paper P ("Xerox 4200" manufactured by Fuji Xerox Co., Ltd.) that was connected to a load cell 30 and had a size of 80 mm×210 mm was held between a paper feed roll 10 formed of a rubber layer 11 and a shaft 12 and Teflon (registered trade mark)-made baseplate 20, and paper feed roll 10 was pressed against baseplate 20 with a vertical load W (W=250 gf) as illustrated by a vertical arrow in the drawing. Next, paper feed roll 10 was rotated in a direction illustrated by an arrow a in the drawing at a circumferential speed of 300 mm/sec while the measurement was performed with the load cell, for force with which the paper was pulled, that is, friction force generated (force F illustrated by a white arrow in the drawing). The coefficient of friction μ was derived from F [gf] and the load W [gf] by a following formula (5):

$$\text{Coefficient of friction } \mu = F \text{ [gf]}/W \text{ [gf]} \quad (5).$$

The measurement of the coefficient of friction was performed at an initial stage and after supply of a predetermined number of sheets of paper.

<Measurement of Outer Diameter of Roll>

An outer diameter of the roll was measured using a laser dimension measuring instrument (KEYENCE LS-3100) under an environment with a temperature of 10° C. and a humidity of 15% and variation in outer diameter was calculated. Here, the "variation in outer diameter" refers to a value obtained by deducting the outer diameter of an initial roll from the outer diameter of the roll that has supplied a predetermined number of sheets of paper. The roll having a smaller "absolute value" for the variation in outer diameter is unlikely to allow the rubber to be scraped, indicating being excellent in wear resistance.

<Evaluation of Viscoelastic Characteristics and Paper Supply Performance>

Paper supply performance was evaluated according to the above-described tensile characteristics measurement (S-S measurement), viscoelasticity measurement, paper supply test, and measurement of the coefficient of friction μ and the variation in outer diameter. Pick-up roll 10P and retard toll 10R each normally require a larger coefficient of friction between the roll and a sheet than the coefficient of friction between sheets. When one sheet is delivered by pick-up roll 10P from the sheet cassette to the nip part formed between feed roll 10F and retard roll 10R, feed roll 10F needs to deliver the sheet while overcoming delivery resistance by retard roll 10R having a function of preventing overlap feed of sheets, so that the residual coefficient of friction of feed roll 10F is very important. When a plurality of sheets of paper P are delivered on top of one another to this nip part formed between feed roll 10F and retard roll 10R, retard roll 10R has a function of applying delivery resistance to a lower surface (back surface) of paper P and thus suppressing overlap feed of paper P delivered by feed roll 10F, so that the retard roll easily progresses wear due to a larger load applied thereto than the load applied to pick-up roll 10P or feed roll 10F. Therefore, in order to allow the paper feeding mechanism to retain a stable separation delivery function over a long period, it is important to reduce the wear of retard roll 10R. Accordingly, here, the coefficient of friction of feed roll 10F was taken as the coefficient of friction, and the variation in outer diameter of retard roll 10R was taken as the variation in outer diameter. The results were shown in Tables 6 to 10 and FIGS. 19 to 23. For the "paper supply performance" in Tables 6 to 10, A was assigned for the case where feed roll 10F had a residual coefficient of friction of greater than or equal to 1.0 and retard roll 10R had an absolute value of less than or equal to 0.22 mm for the variation in outer diameter at the time when the number of supplied sheets of paper reached 40000, B1 was assigned for the case where feed roll 10F had a residual coefficient of friction of greater than or equal to 1.0 but retard roll 10R had an absolute value of larger than 0.22 mm for the variation in outer diameter at the time when the number of supplied sheets of paper reached 40000, and B2 was assigned for the case where retard roll 10R had an absolute value of less than or equal to 0.22 mm for the variation in outer diameter but feed roll 10F had a residual coefficient of friction of less than 1.0 at the time when the number of supplied sheets of paper reached 40000. In addition, C was assigned for the case where feed roll 10F already had a residual coefficient of friction of less than 1.0 at the time when the number of supplied sheets of paper reached 10,000. Further, D was assigned when it was possible to perform press molding but the volatilization volume of the softener was large in the following secondary vulcanization process, and contraction of the roll sample attributed to the large volatilization volume was large to be capable of giving no roll sample having the desired shape, and E was assigned when the press molding was capable of giving no roll sample having the desired shape.

Figure 19:
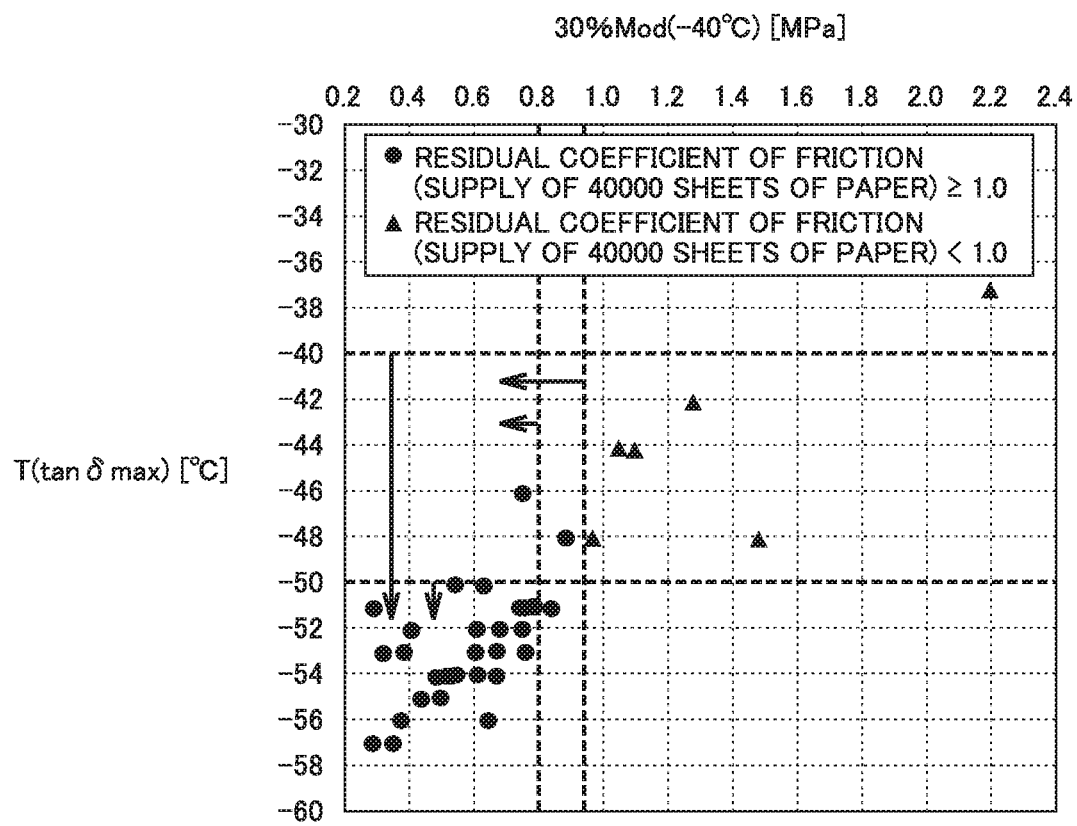
FIG. 19 is a graph illustrating a relationship between the 30% Mod (−40° C.) and T(tan δmax) in feed rolls of examples and comparative examples.
Figure 20:
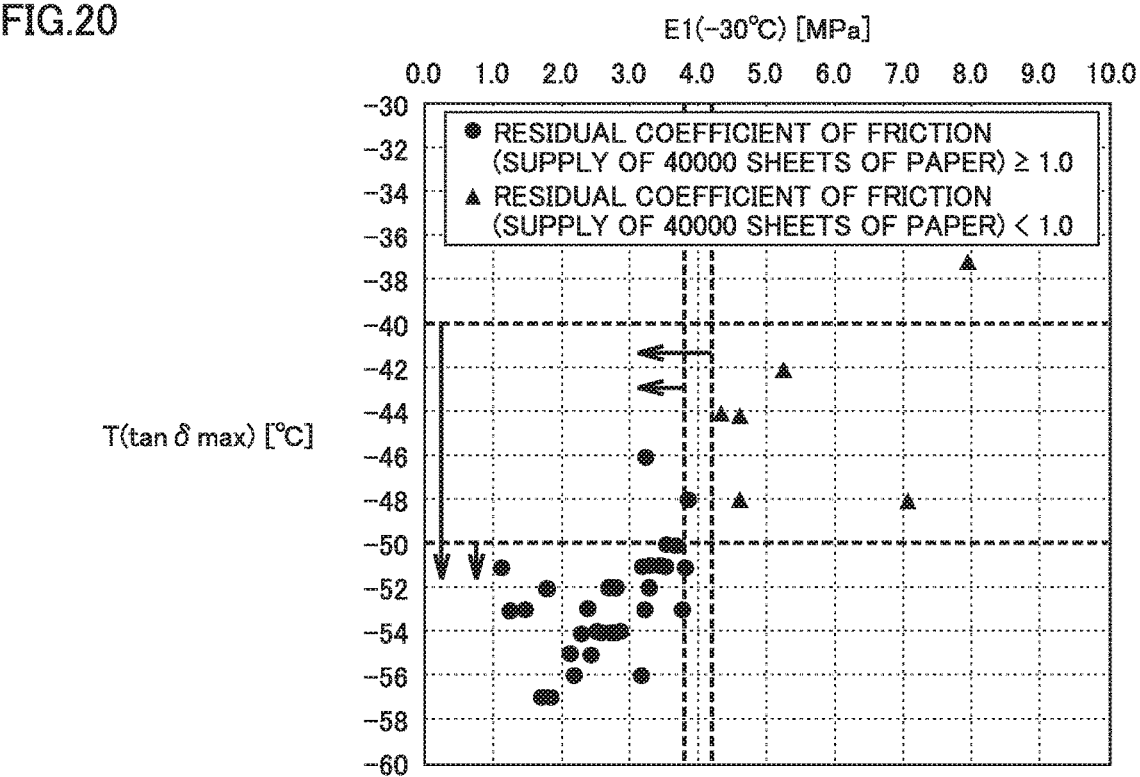
FIG. 20 is a graph illustrating a relationship between the E1 (−30° C.) and the T(tan δmax) in the feed rolls of the examples and the comparative examples.
Figure 21:
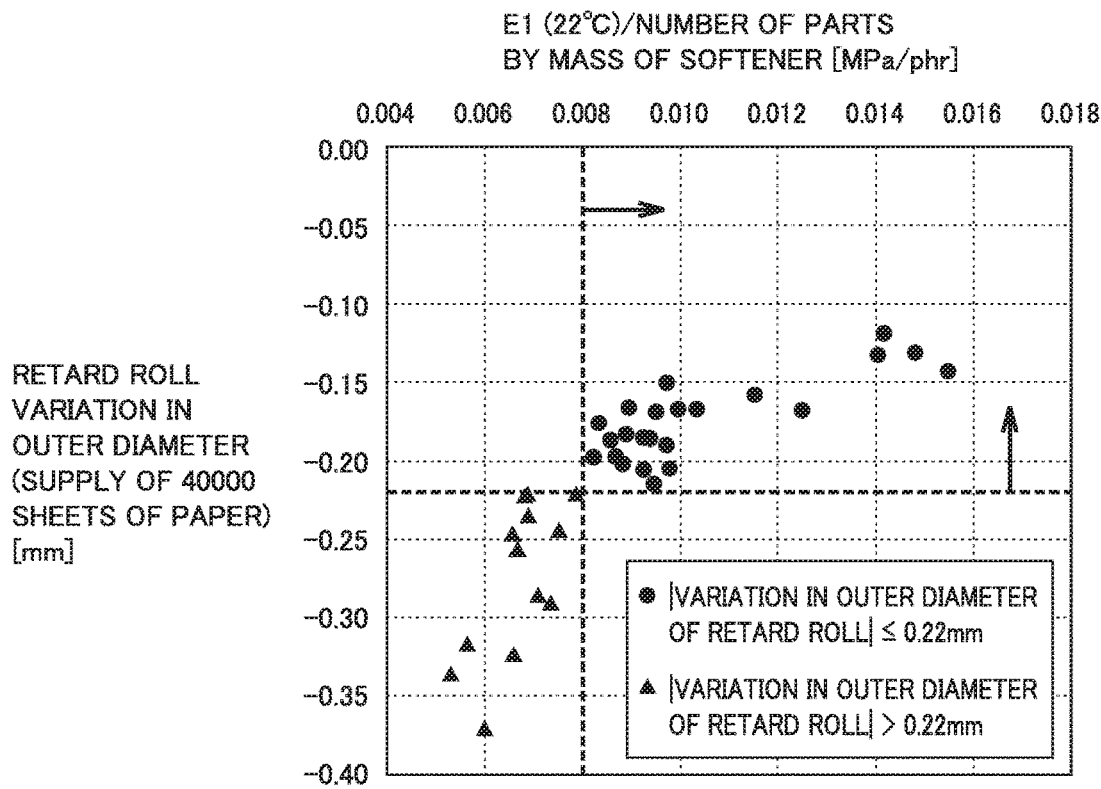
FIG. 21 is a graph illustrating a relationship between the E1 (22° C.)/number of parts by mass of softener and the variation in outer diameter of a retard roll that has undergone a 40000-sheet paper supply test in the examples and the comparative examples.
Figure 22:
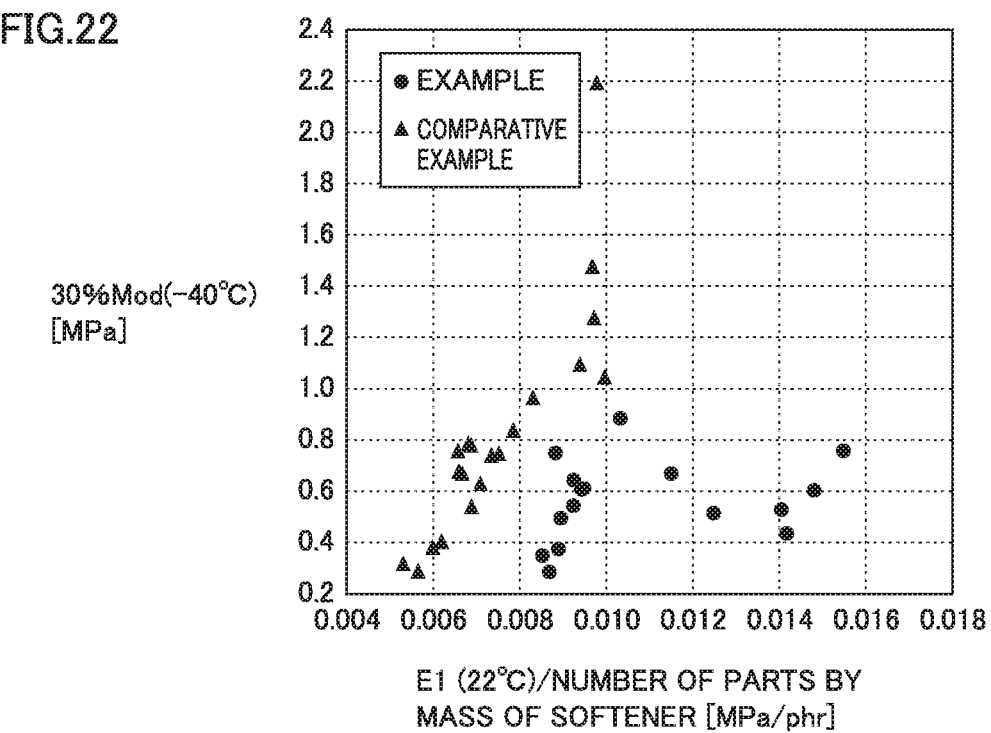
FIG. 22 is a graph illustrating a relationship between the E1 (22° C.)/number of parts by mass of softener and the 30% Mod (−40° C.) in the examples and the comparative examples.
Figure 23:
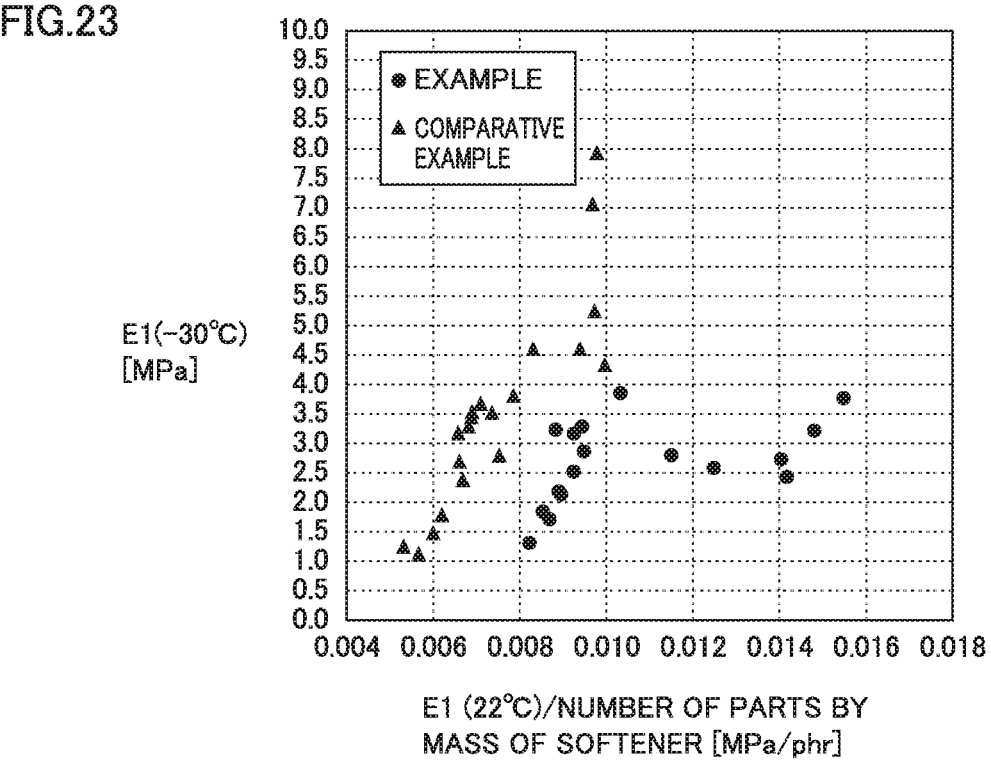
FIG. 23 is a graph illustrating a relationship between the E1 (22° C.)/number of parts by mass of softener and the E1 (−30° C.) in the examples and the comparative examples.
Figure 24:
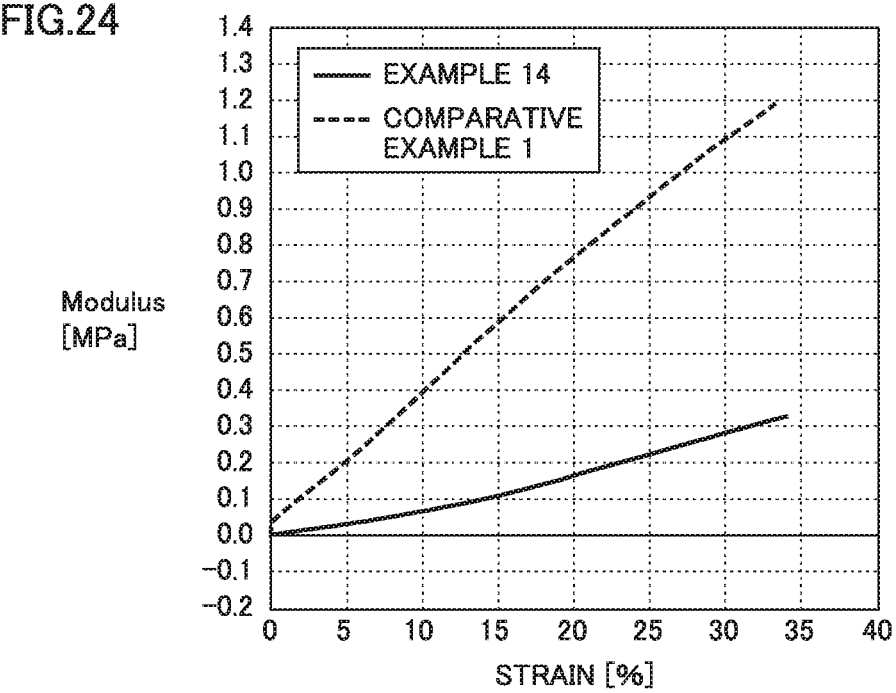
FIG. 24 is a graph illustrating S-S curve characteristics at −40° C. in Example 14 and Comparative Example 1.

FIG. 19 is a graph illustrating a relationship between the 30% Mod (−40° C.) and the T(tan δmax) in feed rolls 10F of the examples and the comparative examples. In FIG. 19, the horizontally extending dashed lines represent lines of T(tan δmax)=−40° C. and T(tan δmax)=−50° C., and the vertically extending dashed lines represent lines of 30% Mod (−40° C.)=0.94 MPa and 30% Mod (−40° C.)=0.80 MPa. FIG. 20 is a graph illustrating a relationship between the E1 (−30° C.) and the T(tan δmax) in feed rolls 10F of the examples and the comparative examples. In FIG. 20, the horizontally extending dashed lines represent lines of T(tan δmax)=−40° C. and T(tan δmax)=−50° C., and the vertically extending dashed lines represent lines of E1 (−30° C.)=4.2 MPa and E1 (−30° C.)=3.8 MPa. FIG. 21 is a graph illustrating a relationship between the E1 (22° C.)/number of parts by mass of softener and the variation in outer diameter of retard rolls 10R in the examples and the comparative examples. In FIG. 21, the horizontally extending dashed line represents a line of variation in outer diameter of retard roll=−0.22 mm, and the vertically extending dashed line represents a line of E1 (22° C.)/number of parts by mass of softener=0.008 MPa/phr. FIG. 22 is a graph illustrating a relationship between the E1 (22° C.)/number of parts by mass of softener and the 30% Mod (−40° C.) in the examples and the comparative examples. FIG. 23 is a graph illustrating a relationship between the E1 (22° C.)/number of parts by mass of softener and the E1 (−30° C.) in the examples and the comparative examples. FIG. 24 is a graph illustrating S-S curve characteristics at −40° C. in Example 14 and Comparative Example 1.

TABLE 1

| Example | | | Example 1 | Example 2 | Example 3 | Example 4 | Example 5 | Example 6 | Example 7 | Example 8 | Example 9 |
|---|---|---|---|---|---|---|---|---|---|---|---|
| Polymer EPDM | EP57F(*1) | (part by mass) | | | | | | | | | 100 |
| | EP103AF(*2) | (part by mass) | | | | | | | | 50 | |
| | KELTAN 5170P(*3) | (part by mass) | | | | | | | | | |
| | Vistalon 9301(*4) | (part by mass) | | | | | | | | | |
| | KELTAN 5260Q(*5) | (part by mass) | | | | | 25 | 50 | 50 | 50 | |
| | E532(*6) | (part by mass) | | | | | | | | | |
| | E5128(*7) | (part by mass) | | | | | | | | | |
| | Vistalon 5601(*8) | (part by mass) | | | | | | | | | |
| | Vistalon 7001(*9) | (part by mass) | | | | | | | | | |

TABLE 1-continued

| Example | | | Example 1 | Example 2 | Example 3 | Example 4 | Example 5 | Example 6 | Example 7 | Example 8 | Example 9 |
|---|---|---|---|---|---|---|---|---|---|---|---|
| | KELTAN 9650Q(*10) | (part by mass) | | | | | | | | | |
| | 512F(*11) | (part by mass) | | | | | | | | | |
| Filler (colored) | DENKA BLACK (*23) | (part by mass) | 100 | 100 | 100 | 100 | 75 | 50 | 50 | | |
| Processing aid | Stearic acid (*24) | (part by mass) | 1 | 1 | 1 | 1 | 1 | 1 | 1 | 1 | 1 |
| Vulcanization accelerator aid | Zinc white (*25) | (part by mass) | 5 | 5 | 5 | 5 | 5 | 5 | 5 | 5 | 5 |
| Reinforcing filler | Nipsil VN3(*26) | (part by mass) | 5 | 5 | 5 | 5 | | | | | |
| Softener | SUNPURE LW70(*12) | (part by mass) | | | | | | | | | |
| | PW32(*13) | (part by mass) | 100 | | | | | | | | |
| | PW90(*14) | (part by mass) | | | | | | | | | |
| | PW380(*15) | (part by mass) | | | | | | | | | |
| | LUCANT HC-40(*16) | (part by mass) | | | | | | | | | |
| | LUCANT HC-100(*17) | (part by mass) | | | | | | | | | |
| | LUCANT HC-600(*18) | (part by mass) | | | | | | | | | |
| | Synfluid PAO4(*19) | (part by mass) | | 100 | | | | | | | |
| | Synfluid PAO9(*20) | (part by mass) | | | 100 | | | | | | |
| | LIALCARB SR1000/R(*21) | (part by mass) | | | | 100 | 85 | 75 | 80 | 55 | 95 |
| | NAS-5H (*22) | (part by mass) | | | | | | | | | |
| Vulcanizing agent | Sulfur (*27) | (part by mass) | 1.5 | 1.5 | 1.5 | 1.5 | 1.5 | 1.5 | 1.5 | 1.5 | 1.5 |
| Vulcanization accelerator | NOCCELER DM (*28) | (part by mass) | 1.0 | 1.0 | 1.0 | 1.0 | 0.8 | 0.8 | 0.8 | 0.8 | 0.8 |
| | NOCCELER TRA (*29) | (part by mass) | 1.0 | 1.0 | 1.0 | 1.0 | 1.0 | 1.0 | 1.0 | 1.0 | 1.0 |
| | NOCCELER BZ (*30) | (part by mass) | 0.5 | 0.5 | 0.5 | 0.5 | 0.5 | 0.5 | 0.5 | 0.5 | 0.5 |
| | NOCCELER EZ (*31) | (part by mass) | 0.5 | 0.5 | 0.5 | 0.5 | 0.5 | 0.5 | 0.5 | 0.5 | 0.5 |
| | NOCCELER TTCu (*32) | (part by mass) | | | | | | | | | |
| Total | | (part by mass) | 215.75 | 215.75 | 215.75 | 215.75 | 195.55 | 185.55 | 190.55 | 165.55 | 205.55 |
| Weighted average of mooney viscosity ML 1 + 4 (125° C.) | | | 66.0 | 66.0 | 66.0 | 66.0 | 66.3 | 60.5 | 60.5 | 73.0 | 58.0 |
| Weighted average of content of ethylene component unit | | (% by mass) | 65.0 | 65.0 | 65.0 | 65.0 | 64.3 | 63.5 | 63.5 | 60.5 | 66.0 |
| Weighted average of content of diene component unit (ENB) | | (% by mass) | 4.0 | 4.0 | 4.0 | 4.0 | 3.6 | 3.2 | 3.2 | 3.4 | 4.5 |
| Proportion of polymer component | | (% by mass) | 46.3 | 46.3 | 46.3 | 46.3 | 51.1 | 53.9 | 52.5 | 60.4 | 48.6 |

TABLE 2

| Example | | | Example 10 | Example 11 | Example 12 | Example 13 | Example 14 | Example 15 | Example 16 | Example 17 | Example 18 |
|---|---|---|---|---|---|---|---|---|---|---|---|
| Polymer EPDM | EP57F(*1) | (part by mass) | | | | 75 | 50 | 25 | 100 | 75 | 25 |
| | EP103AF(*2) | (part by mass) | | | | | | | | | |
| | KELTAN 5170P(*3) | (part by mass) | | | | | | | | | |
| | Vistalon 9301(*4) | (part by mass) | | | | | | | | | |
| | KELTAN 5260Q(*5) | (part by mass) | 25 | 50 | 75 | | | | | 25 | 75 |
| | E532(*6) | (part by mass) | | | | 25 | 50 | 75 | | | |
| | E5128(*7) | (part by mass) | | | | | | | | | |
| | Vistalon 5601(*8) | (part by mass) | | | | 25 | | | | | |
| | Vistalon 7001(*9) | (part by mass) | | | | | | | | | |
| | KELTAN 9650Q(*10) | (part by mass) | | | | | | | | | |
| | 512F(*11) | (part by mass) | 75 | 50 | | | | | | | |
| Filler (colored) | DENKA BLACK (*23) | (part by mass) | 0.25 | 0.25 | 0.25 | 0.25 | 0.25 | 0.25 | 0.25 | 0.25 | 0.25 |
| Processing aid | Stearic acid (*24) | (part by mass) | 1 | 1 | 1 | 1 | 1 | 1 | 1 | 1 | 1 |
| Vulcanization accelerator aid | Zinc white (*25) | (part by mass) | 5 | 5 | 5 | 5 | 5 | 5 | 5 | 5 | 5 |
| Reinforcing filler | Nipsil VN3(*26) | (part by mass) | | | | | | | | | |
| Softener | SUNPURE LW70(*12) | (part by mass) | | | | | | | | | |
| | PW32(*13) | (part by mass) | | | | | | | | | |
| | PW90(*14) | (part by mass) | | | | | | | | | |
| | PW380(*15) | (part by mass) | | | | | | | | | |
| | LUCANT HC-40(*16) | (part by mass) | | | | | | | | | |
| | LUCANT HC-100(*17) | (part by mass) | | | | | | | | | |
| | LUCANT HC-600(*18) | (part by mass) | | | | | | | | | |
| | Synfluid PAO4(*19) | (part by mass) | | | | | | | | | |
| | Synfluid PAO9(*20) | (part by mass) | | | | | | | | | |
| | LIALCARB SR1000/R(*21) | (part by mass) | 95 | 95 | 95 | 95 | 95 | 95 | 75 | 75 | 75 |
| | NAS-5H (*22) | (part by mass) | | | | | | | | | |
| Vulcanizing agent | Sulfur (*27) | (part by mass) | 1.5 | 1.5 | 1.5 | 1.5 | 1.5 | 1.5 | 1.5 | 1.5 | 1.5 |
| Vulcanization accelerator | NOCCELER DM (*28) | (part by mass) | 0.8 | 0.8 | 0.8 | 0.8 | 0.8 | 0.8 | 0.8 | 0.8 | 0.8 |
| | NOCCELER TRA (*29) | (part by mass) | 1.0 | 1.0 | 1.0 | 1.0 | 1.0 | 1.0 | 1.0 | 1.0 | 1.0 |

TABLE 2-continued

| Example | | | Example 10 | Example 11 | Example 12 | Example 13 | Example 14 | Example 15 | Example 16 | Example 17 | Example 18 |
|---|---|---|---|---|---|---|---|---|---|---|---|
| | NOCCELER BZ (*30) | (part by mass) | 0.5 | 0.5 | 0.5 | 0.5 | 0.5 | 0.5 | 0.5 | 0.5 | 0.5 |
| | NOCCELER EZ (*31) | (part by mass) | 0.5 | 0.5 | 0.5 | 0.5 | 0.5 | 0.5 | 0.5 | 0.5 | 0.5 |
| | NOCCELER TTCu (*32) | (part by mass) | | | | | | | | | |
| Total | | (part by mass) | 205.55 | 205.55 | 205.55 | 205.55 | 205.55 | 205.55 | 185.55 | 185.55 | 185.55 |
| Weighted average of mooney viscosity ML 1 + 4 (125° C.) | | | 63.3 | 60.5 | 59.3 | 63.8 | 69.5 | 75.3 | 58.0 | 57.3 | 55.8 |
| Weighted average of content of ethylene component unit | | (% by mass) | 64.3 | 63.5 | 63.8 | 62.3 | 58.5 | 54.8 | 66.0 | 65.0 | 63.0 |
| Weighted average of content of diene component unit (ENB) | | (% by mass) | 3.6 | 3.2 | 3.0 | 4.3 | 4.0 | 3.8 | 4.5 | 4.0 | 2.9 |
| Proportion of polymer component | | (% by mass) | 48.6 | 48.6 | 48.6 | 48.6 | 48.6 | 48.6 | 53.9 | 53.9 | 53.9 |

TABLE 3

| Example | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Polymer EPDM | EP57F(*1) (part by mass) | 100 | | | | | | | | |
| | EP103AF(*2) (part by mass) | | 100 | | | | | | | |
| | KELTAN 5170P(*3) (part by mass) | | | 100 | | | | | | |
| | Vistalon 9301(*4) (part by mass) | | | | 100 | | | | | |
| | KELTAN 5260Q(*5) (part by mass) | | | | | 100 | | | | |
| | E532(*6) (part by mass) | | | | | | 100 | | | |
| | E5128(*7) (part by mass) | | | | | | | 100 | | |
| | Vistalon 5601(*8) (part by mass) | | | | | | | | 100 | |
| | Vistalon 7001(*9) (part by mass) | | | | | | | | | 100 |
| | KELTAN 9650Q(*10) (part by mass) | | | | | | | | | |
| | 512F(*11) (part by mass) | | | | | | | | | |
| Filler (colored) | DENKA BLACK (*23) (part by mass) | 0.25 | 0.25 | 0.25 | 0.25 | 0.25 | 0.25 | 0.25 | 0.25 | 0.25 |
| Processing aid | Stearic acid (*24) (part by mass) | 1 | 1 | 1 | 1 | 1 | 1 | 1 | 1 | 1 |
| Vulcanization accelerator aid | Zinc white (*25) (part by mass) | 5 | 5 | 5 | 5 | 5 | 5 | 5 | 5 | 5 |
| Reinforcing filler | Nipsil VN3(*26) (part by mass) | 5 | 5 | 5 | 5 | 5 | 5 | 5 | 5 | 5 |
| Softener | SUNPURE LW70(*12) (part by mass) | | | | | | | | | |
| | PW32(*13) (part by mass) | | | | | | | | | |
| | PW90(*14) (part by mass) | 100 | 100 | 100 | 100 | 120 | 120 | 120 | 120 | 120 |
| | PW380(*15) (part by mass) | | | | | | | | | |
| | LUCANT HC-40(*16) (part by mass) | | | | | | | | | |
| | LUCANT HC-100(*17) (part by mass) | | | | | | | | | |
| | LUCANT HC-600(*18) (part by mass) | | | | | | | | | |
| | Synfluid PAO4(*19) (part by mass) | | | | | | | | | |
| | Synfluid PAO9(*20) (part by mass) | | | | | | | | | |
| | LIALCARB SR1000/R(*21) (part by mass) | | | | | | | | | |
| | NAS-5H (*22) (part by mass) | | | | | | | | | |
| Vulcanizing agent | Sulfur (*27) (part by mass) | 1.5 | 1.5 | 1.5 | 1.5 | 1.5 | 1.5 | 1.5 | 1.5 | 1.5 |
| Vulcanization accelerator | NOCCELER DM (*28) (part by mass) | 1.0 | 1.0 | 1.0 | 1.0 | 0.5 | 1.2 | 0.5 | 0.5 | 0.5 |
| | NOCCELER TRA (*29) (part by mass) | 1.0 | 1.0 | 1.0 | 1.0 | 1.0 | 1.0 | 1.0 | 1.0 | 1.0 |
| | NOCCELER BZ (*30) (part by mass) | 0.5 | 0.5 | 0.5 | 0.5 | 0.5 | 0.5 | 0.5 | 0.5 | 0.5 |
| | NOCCELER EZ (*31) (part by mass) | 0.5 | 0.5 | 0.5 | 0.5 | 0.5 | | 0.5 | 0.5 | 0.5 |
| | NOCCELER TTCu (*32) (part by mass) | | | | | | 0.5 | | | |
| Total | | 215.75 | 215.75 | 215.75 | 215.75 | 235.25 | 237.45 | 235.25 | 235.25 | 235.25 |
| Weighted average of mooney viscosity ML 1 + 4 (125° C.) | | 58.0 | 58.0 | 58.0 | 58.0 | 60.0 | 58.0 | 58.0 | 94.0 | 91.0 |
| Weighted average of content of ethylene component unit (% by mass) | | 66.0 | 66.0 | 66.0 | 66.0 | 73.0 | 66.0 | 66.0 | 53.0 | 59.0 |
| Weighted average of content of diene component unit (ENB) (% by mass) | | 4.5 | 4.5 | 4.5 | 4.5 | 5.0 | 4.5 | 4.5 | 6.5 | 4.5 |
| Proportion of polymer component (% by mass) | | 46.3 | 46.3 | 46.3 | 46.3 | 42.5 | 42.1 | 42.5 | 42.5 | 42.5 |

TABLE 4

| Example | | | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| Polymer EPDM | EP57F(*1) | (part by mass) | 75 | 100 | 100 | 100 | 100 | 50 | | |
| | EP103AF(*2) | (part by mass) | | | | | | | 100 | 50 |
| | KELTAN 5170P(*3) | (part by mass) | 25 | | | | | | | 50 |
| | Vistalon 9301(*4) | (part by mass) | | | | | | | | |
| | KELTAN 5260Q(*5) | (part by mass) | | | | | | 50 | | |
| | E532(*6) | (part by mass) | | | | | | | | |
| | E5128(*7) | (part by mass) | | | | | | | | |
| | Vistalon 5601(*8) | (part by mass) | | | | | | | | |
| | Vistalon 7001(*9) | (part by mass) | | | | | | | | |
| | KELTAN 9650Q(*10) | (part by mass) | | | | | | | | |
| | 512F(*11) | (part by mass) | | | | | | | | |
| Filler (colored) | DENKA BLACK (*23) | (part by mass) | 0.25 | 0.25 | 0.25 | 0.25 | 0.25 | 0.25 | 0.25 | 0.25 |
| Processing aid | Stearic acid (*24) | (part by mass) | 1 | 1 | 1 | 1 | 1 | 1 | 1 | 1 |
| Vulcanization accelerator aid | Zinc white (*25) | (part by mass) | 5 | 5 | 5 | 5 | 5 | 5 | 5 | 5 |
| | | | 5 | 5 | 5 | 5 | 5 | 5 | 5 | 5 |
| Reinforcing filler | Nipsil VN3(*26) | (part by mass) | | | | | | | | |
| Softener | SUNPURE LW70(*12) | (part by mass) | | | | | | | | |
| | PW32(*13) | (part by mass) | 120 | 120 | 120 | 120 | 120 | 120 | 120 | 120 |
| | PW90(*14) | (part by mass) | | | | | | | | |
| | PW380(*15) | (part by mass) | | | | | | | | |
| | LUCANT HC-40(*16) | (part by mass) | | | | | | | | |
| | LUCANT HC-100(*17) | (part by mass) | | | | | | | | |
| | LUCANT HC-600(*18) | (part by mass) | | | | | | | | |
| | Synfluid PAO4(*19) | (part by mass) | | | | | | | | |
| | Synfluid PAO9(*20) | (part by mass) | | | | | | | | |
| | LIALCARB SR1000/R(*21) | (part by mass) | | | | | | | | |
| | NAS-5H (*22) | (part by mass) | | | | | | | | |
| Vulcanizing agent | Sulfur (*27) | (part by mass) | 1.5 | 1.0 | 3.0 | 1.0 | 1.5 | 1.5 | 1.5 | 1.5 |
| Vulcanization accelerator | NOCCELER DM (*28) | (part by mass) | 0.5 | 0.5 | 0.5 | 1.2 | 1.2 | 0.5 | 0.5 | 0.5 |
| | NOCCELER TRA (*29) | (part by mass) | 1.0 | 1.0 | 1.0 | 1.0 | 1.0 | 1.0 | 1.0 | 1.0 |
| | NOCCELER BZ (*30) | (part by mass) | 0.5 | 0.5 | 0.5 | 0.5 | 0.5 | 0.5 | 0.5 | 0.5 |
| | NOCCELER EZ (*31) | (part by mass) | 0.5 | 0.5 | 0.5 | | | 0.5 | 0.5 | 0.5 |
| | NOCCELER TTCu (*32) | (part by mass) | | | | 0.5 | 0.5 | | | |
| Total | | (part by mass) | 235.25 | 234.75 | 236.75 | 235.45 | 235.95 | 235.25 | 235.25 | 235.25 |
| Weighted average of mooney viscosity ML 1 + 4 (125° C.) | | | 58.3 | 58.0 | 58.0 | 58.0 | 58.0 | 56.5 | 91.0 | 75.0 |
| Weighted average of content of ethylene component unit | | (% by mass) | 67.3 | 66.0 | 66.0 | 66.0 | 66.0 | 64.0 | 59.0 | 65.0 |
| Weighted average of content of diene component unit (ENB) | | (% by mass) | 3.8 | 4.5 | 4.5 | 4.5 | 4.5 | 3.4 | 4.5 | 3.0 |
| Proportion of polymer component | | (% by mass) | 42.5 | 42.6 | 42.2 | 42.5 | 42.4 | 42.5 | 42.5 | 42.5 |

TABLE 5

| Example | | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|---|
| Polymer EPDM | EP57F(*1) (part by mass) | 50 | | | | | | | | |
| | EP103AF(*2) (part by mass) | | 50 | | | | | | | 50 |
| | KELTAN 5170P(*3) (part by mass) | 50 | | | | | | | | |
| | Vistalon 9301(*4) (part by mass) | | 50 | | | | | | | |
| | KELTAN 5260Q(*5) (part by mass) | | | 100 | 100 | 100 | 100 | | | |
| | E532(*6) (part by mass) | | | | | | | | | |
| | E5128(*7) (part by mass) | | | | | | | | | |
| | Vistalon 5601(*8) (part by mass) | | | | | | | 100 | | |
| | Vistalon 7001(*9) (part by mass) | | | | | | | | 15 | |
| | KELTAN 9650Q(*10) (part by mass) | | | | | | | | 85 | 50 |
| | 512F(*11) (part by mass) | | | | | | | | | |
| Filler (colored) | DENKA BLACK (*23) (part by mass) | 0.25 | 0.25 | 0.25 | 0.25 | 0.25 | 0.25 | 0.25 | 0.25 | 0.25 |
| Processing aid | Stearic acid (*24) (part by mass) | 1 | 1 | 1 | 1 | 1 | 1 | 1 | 1 | 1 |
| Vulcanization accelerator aid | Zinc white (*25) (part by mass) | 5 | 5 | 5 | 5 | 5 | 5 | 5 | 5 | 5 |
| Reinforcing filler | Nipsil VN3(*26) (part by mass) | 5 | 5 | 5 | 5 | 5 | 5 | 5 | 5 | 5 |
| Softener | SUNPURE LW70(*12) (part by mass) | | | | 100 | | | | | |
| | PW32(*13) (part by mass) | | | | | | | | | |
| | PW90(*14) (part by mass) | 120 | 120 | 120 | | | | 120 | 120 | 120 |
| | PW380(*15) (part by mass) | | | | | | | | | |
| | LUCANT HC-40(*16) (part by mass) | | | | | | | | | |
| | LUCANT HC-100(*17) (part by mass) | | | | | 100 | | | | |
| | LUCANT HC-600(*18) (part by mass) | | | | | | | | | |
| | Synfluid PAO4(*19) (part by mass) | | | | | | | | | |
| | Synfluid PAO9(*20) (part by mass) | | | | | | | | | |
| | LIALCARB SR1000/R(*21) (part by mass) | | | | | | 100 | | | |
| | NAS-5H (*22) (part by mass) | | | | | | | | | |
| Vulcanizing agent | Sulfur (*27) (part by mass) | 1.5 | 1.5 | 1.5 | 1.5 | 1.5 | 1.5 | 1.5 | 1.5 | 1.5 |
| Vulcanization accelerator | NOCCELER DM (*28) (part by mass) | 0.5 | 0.5 | 0.5 | 0.5 | 0.5 | 0.5 | 0.5 | 0.5 | 0.5 |
| | NOCCELER TRA (*29) (part by mass) | 1.0 | 1.0 | 1.0 | 1.0 | 1.0 | 1.0 | 1.0 | 1.0 | 1.0 |
| | NOCCELER BZ (*30) (part by mass) | 0.5 | 0.5 | 0.5 | 0.5 | 0.5 | 0.5 | 0.5 | 0.5 | 0.5 |
| | NOCCELER EZ (*31) (part by mass) | 0.5 | 0.5 | 0.5 | 0.5 | 0.5 | 0.5 | 0.5 | 0.5 | 0.5 |
| | NOCCELER TTCu (*32) (part by mass) | | | | | | | | | |
| Total | (part by mass) | 235.25 | 235.25 | 235.25 | 215.75 | 215.75 | 215.75 | 235.25 | 235.25 | 235.25 |
| Weighted average of mooney viscosity ML 1 + 4 (125° C.) | | 79.0 | 73.0 | 58.0 | 58.0 | 58.0 | 58.0 | 59.0 | 58.9 | 52.0 |
| Weighted average of content of ethylene (% by mass) | | 64.0 | 60.5 | 66.0 | 66.0 | 66.0 | 66.0 | 71.0 | 70.3 | 67.0 |
| Weighted average of content of diene component unit (ENB) (% by mass) | | 3.7 | 3.4 | 4.5 | 4.5 | 4.5 | 4.5 | 1.5 | 2.0 | 2.6 |
| Proportion of polymer component (% by mass) | | 42.5 | 42.5 | 42.5 | 46.3 | 46.3 | 46.3 | 42.5 | 42.5 | 42.5 |

Notes (*) in Tables 1 to 5 are as follows.

(*1) EP57F is an EPDM (non-oil extended) manufactured by JSR Corporation and has a mooney viscosity ML 1+4 (125° C.) of 58, a content of the ethylene component unit of 66% by mass, and a content of the diene component unit of 4.5% by mass.

(*2) EP103AF is an EPDM (non-oil extended) manufactured by JSR Corporation and has a mooney viscosity ML 1+4 (125° C.) of 91, a content of the ethylene component unit of 59% by mass, and a content of the diene component unit of 4.5% by mass.

(*3) KELTAN5170P is an EPDM (non-oil extended) manufactured by LANXESS and has a mooney viscosity ML 1+4 (125° C.) of 59, a content of the ethylene component unit of 71% by mass, and a content of the diene component unit of 1.5% by mass.

(*4) Vistalon9301 is an EPDM (non-oil extended) manufactured by Exxon Mobil Corporation and has a mooney viscosity ML 1+4 (125° C.) of 67, a content of the ethylene component unit of 69% by mass, and a content of the diene component unit of 2.8% by mass.

(*5) KELTAN5260Q is an EPDM (non-oil extended) manufactured by LANXESS and has a mooney viscosity ML 1+4 (125° C.) of 55, a content of the ethylene component unit of 62% by mass, and a content of the diene component unit of 2.3% by mass.

(*6) E532 is an EPDM (non-oil extended) manufactured by Sumitomo Chemical Co., Ltd. and has a mooney viscosity ML 1+4 (125° C.) of 81, a content of the ethylene component unit of 51% by mass, and a content of the diene component unit of 3.5% by mass.

(*7) E5128 is an EPDM (non-oil extended) manufactured by Sumitomo Chemical Co., Ltd. and has a mooney viscosity ML 1+4 (125° C.) of 46, a content of the ethylene component unit of 68% by mass, and a content of the diene component unit of 0.6% by mass.

(*8) Vistalon5601 is an EPDM (non-oil extended) manufactured by Exxon Mobil Corporation and has a mooney viscosity ML 1+4 (125° C.) of 72, a content of the ethylene component unit of 69% by mass, and a content of the diene component unit of 5.0% by mass.

(*9) Vistalon7001 is an EPDM (non-oil extended) manufactured by Exxon Mobil Corporation and has a mooney viscosity ML 1+4 (125° C.) of 60, a content of the ethylene component unit of 73% by mass, and a content of the diene component unit of 5.0% by mass.

(*10) KELTAN9650Q is an EPDM (non-oil extended) manufactured by LANXESS and has a mooney viscosity ML 1+4 (125° C.) of 94, a content of the ethylene component unit of 53% by mass, and a content of the diene component unit of 6.5% by mass.

(*11) 512F is an EPDM (non-oil extended) manufactured by Sumitomo Chemical Co., Ltd. and has a mooney viscosity ML 1+4 (125° C.) of 66, a content of the ethylene component unit of 65% by mass, and a content of the diene component unit of 4.0% by mass.

(*12) SUNPURE LW70 is a paraffin-based petroleum blended oil (processed oil) manufactured by JAPAN SUN OIL COMPANY, LTD. and has a kinematic viscosity at 40° C. of 12.40 mm$^2$/sec.

(*13) PW32 is a paraffin-based petroleum blended oil (processed oil) manufactured by Idemitsu Kosan Co., Ltd. and has a kinematic viscosity at 40° C. of 30.85 mm$^2$/sec.

(*14) PW90 is a paraffin-based petroleum blended oil (processed oil) manufactured by Idemitsu Kosan Co., Ltd. and has a kinematic viscosity at 40° C. of 95.54 mm$^2$/sec.

(*15) PW380 is a paraffin-based petroleum blended oil (processed oil) manufactured by Idemitsu Kosan Co., Ltd. and has a kinematic viscosity at 40° C. of 381.6 mm$^2$/sec.

(*16) LUCANT HC-40 is a hydrocarbon-based synthetic oil manufactured by Mitsui Chemicals, Inc. and has a kinematic viscosity at 40° C. of 400 mm$^2$/sec.

(*17) LUCANT HC-100 is a hydrocarbon-based synthetic oil manufactured by Mitsui Chemicals, Inc. and has a kinematic viscosity at 40° C. of 1300 mm$^2$/sec.

(*18) LUCANT HC-600 is a hydrocarbon-based synthetic oil manufactured by Mitsui Chemicals, Inc. and has a kinematic viscosity at 40° C. of 9850 mm$^2$/sec.

(*19) Synfluid PAO4 is a poly-α-olefin manufactured by Chevron Phillips Chemical Company LP and has a kinematic viscosity at 40° C. of 16.8 mm$^2$/sec.

(*20) Synfluid PAO9 is a poly-α-olefin manufactured by Chevron Phillips Chemical Company LP and has a kinematic viscosity at 40° C. of 53.4 mm$^2$/sec.

(*21) LIALCARB SR-1000/R is a long-chain dialkyl carbonate manufactured by MITSUI FINE CHEMICALS, INC. and has a kinematic viscosity at 40° C. of 17 mm$^2$/sec.

(*22) NAS-5H is an isoparaffin agent manufactured by NOF CORPORATION and has a kinematic viscosity at 40° C. of 11.0 mm$^2$/sec.

(*23) DENKA BLACK is acetylene black manufactured by Denka Company Limited.

(*24) Stearic acid is trade name "LUNAC S-30" manufactured by Kao Corporation.

(*25) Zinc white is zinc oxide (trade name "Zinc Oxide Type I") manufactured by SEIDO CHEMICAL INDUSTRY CO., LTD.

(*26) Nipsil VN3 is silica manufactured by TOSOH SILICA CORPORATION.

(*27) Sulfur is powder sulfur (trade name "SULFAX A") manufactured by Tsurumi Chemical Industry Co., ltd.

(*28) NOCCELER DM is a vulcanization accelerator manufactured by OUCHI SHINKO CHEMICAL INDUSTRIAL CO., LTD.

(*29) NOCCELER TRA is a vulcanization accelerator manufactured by OUCHI SHINKO CHEMICAL INDUSTRIAL CO., LTD.

(*30) NOCCELER BZ is a vulcanization accelerator manufactured by OUCHI SHINKO CHEMICAL INDUSTRIAL CO., LTD.

(*31) NOCCELER EZ is a vulcanization accelerator manufactured by OUCHI SHINKO CHEMICAL INDUSTRIAL CO., LTD.

(*32) NOCCELER TTCu is a vulcanization accelerator manufactured by OUCHI SHINKO CHEMICAL INDUS-TRIAL CO., LTD.

TABLE 6

| Example | | Example 1 | Example 2 | Example 3 | Example 4 | Example 5 | Example 6 | Example 7 | Example 8 | Example 9 |
|---|---|---|---|---|---|---|---|---|---|---|
| Vulcanization conditions | Primary vulcanization [° C. × min] | 160 × 30 | 160 × 30 | 160 × 30 | 160 × 30 | 160 × 30 | 160 × 30 | 160 × 30 | 160 × 30 | 160 × 30 |
| | Secondary vulcanization [° C. × min] | 160 × 60 | 160 × 60 | 160 × 60 | 160 × 60 | 160 × 60 | 160 × 60 | 160 × 60 | 160 × 60 | 160 × 60 |

TABLE 6-continued

| Example | | Example 1 | Example 2 | Example 3 | Example 4 | Example 5 | Example 6 | Example 7 | Example 8 | Example 9 |
|---|---|---|---|---|---|---|---|---|---|---|
| Viscoelasticity | E1(−30° C.) [MPa] | 3.86 | 3.18 | 3.24 | 3.29 | 2.80 | 2.74 | 2.59 | 2.30 | 2.87 |
| | E1(22° C.) [MPa] | 1.03 | 0.93 | 0.88 | 0.94 | 0.98 | 1.05 | 1.00 | 1.24 | 0.90 |
| | tanδmax | 0.814 | 0.574 | 0.544 | 0.515 | 0.598 | 0.670 | 0.659 | 0.976 | 0.551 |
| | T(tanδmax) [° C.] | −48.1 | −56.1 | −46.2 | −52.1 | −54.2 | −54.2 | −54.2 | −54.2 | −54.1 |
| | 30% Mod (−40° C.) [MPa] | 0.88 | 0.64 | 0.75 | 0.61 | 0.67 | 0.53 | 0.51 | 0.48 | 0.61 |
| | E1 (22° C.) number of parts by mass of softener [MPa/phr] | 0.0103 | 0.0093 | 0.0088 | 0.0094 | 0.0115 | 0.0140 | 0.0125 | 0.0225 | 0.0095 |
| Paper supply characteristics | Coefficient of friction of feed roll 0 sheets (initial stage) | 2.225 | 1.925 | 2.162 | 1.780 | 1.919 | 1.908 | 1.920 | 1.996 | 1.869 |
| | 1000 sheets | 1.760 | 1.618 | 1.702 | 1.631 | 1.694 | 1.596 | 1.587 | 1.596 | 1.645 |
| | 5000 sheets | 1.548 | 1.293 | 1.449 | 1.544 | 1.547 | 1.516 | 1.643 | 1.715 | 1.526 |
| | 10000 sheets | 1.248 | 1.177 | 1.211 | 1.428 | 1.425 | 1.393 | 1.393 | 1.266 | 1.527 |
| | 20000 sheets | 1.089 | 1.157 | 1.112 | 1.351 | 1.283 | 1.331 | 1.324 | 1.320 | 1.532 |
| | 30000 sheets | 1.151 | 1.062 | 1.282 | 1.440 | 1.227 | 1.160 | 1.248 | 1.256 | 1.162 |
| | 40000 sheets | 1.011 | 1.053 | 1.062 | 1.303 | 1.150 | 1.270 | 1.235 | 1.065 | 1.160 |
| | Variation in outer diameter of retard roll 0 sheets (initial stage) | 0 | 0 | 0 | 0 | 0 | 0 | 0 | 0 | 0 |
| | 20000 sheets | | | | | −0.0875 | −0.0691 | −0.0941 | −0.0502 | −0.0991 |
| | 40000 sheets | −0.1672 | −0.2055 | −0.2017 | −0.2131 | −0.1580 | −0.1326 | −0.1679 | −0.1023 | −0.1688 |
| Paper supply performance | | A | A | A | A | A | A | A | A | A |

TABLE 7

| Example | | Example 10 | Example 11 | Example 12 | Example 13 | Example 14 | Example 15 | Example 16 | Example 17 | Example 18 |
|---|---|---|---|---|---|---|---|---|---|---|
| Vulcanization conditions | Primary vulcanization [° C. × min] | 160 × 30 | 160 × 30 | 160 × 30 | 160 × 30 | 160 × 30 | 160 × 30 | 160 × 30 | 160 × 30 | 160 × 30 |
| | Secondary vulcanization [° C. × min] | 160 × 60 | 160 × 60 | 160 × 60 | 160 × 60 | 160 × 60 | 160 × 60 | 160 × 60 | 160 × 60 | 160 × 60 |
| Viscoelasticity | E1(−30° C.) [MPa] | 2.53 | 2.14 | 1.85 | 2.19 | 1.72 | 1.32 | 3.78 | 3.23 | 2.44 |
| | E1(22° C.) [MPa] | 0.88 | 0.85 | 0.81 | 0.84 | 0.82 | 0.78 | 1.16 | 1.11 | 1.06 |
| | tanδmax | 0.586 | 0.633 | 0.683 | 0.621 | 0.738 | 0.938 | 0.587 | 0.621 | 0.733 |
| | T(tanδmax) [° C.] | −54.1 | −55.1 | −57.1 | −56.1 | −57.1 | −60.1 | −53.1 | −53.1 | −55.2 |
| | 30% Mod (−40° C.) [MPa] | 0.54 | 0.49 | 0.35 | 0.37 | 0.29 | 0.19 | 0.76 | 0.60 | 0.44 |
| | E1 (22° C.) number of parts by mass of softener [MPa/phr] | 0.0092 | 0.0090 | 0.0085 | 0.0089 | 0.0087 | 0.0082 | 0.0155 | 0.0148 | 0.0142 |
| Paper supply characteristics | Coefficient of friction of feed roll 0 sheets (initial stage) | 1.877 | 1.859 | 1.860 | 1.897 | 1.954 | 2.142 | 1.850 | 1.936 | 1.820 |
| | 1000 sheets | 1.618 | 1.669 | 1.659 | 1.648 | 1.649 | 1.702 | 1.527 | 1.506 | 1.542 |
| | 5000 sheets | 1.529 | 1.652 | 1.552 | 1.590 | 1.535 | 1.560 | 1.523 | 1.570 | 1.520 |
| | 10000 sheets | 1.524 | 1.517 | 1.482 | 1.510 | 1.510 | 1.440 | 1.353 | 1.400 | 1.324 |
| | 20000 sheets | 1.460 | 1.535 | 1.391 | 1.275 | 1.176 | 1.300 | 1.230 | 1.258 | 1.240 |
| | 30000 sheets | 1.189 | 1.366 | 1.380 | 1.327 | 1.280 | 1.333 | 1.137 | 1.188 | 1.222 |
| | 40000 sheets | 1.197 | 1.392 | 1.429 | 1.451 | 1.183 | 1.353 | 1.171 | 1.080 | 1.112 |
| | Variation in outer diameter of retard roll 0 sheets (initial stage) | 0 | 0 | 0 | 0 | 0 | 0 | 0 | 0 | 0 |
| | 20000 sheets | −0.0641 | −0.0944 | −0.1103 | −0.1100 | −0.1196 | −0.1034 | −0.0803 | −0.0618 | — |
| | 40000 sheets | −0.1852 | −0.1661 | −0.1867 | −0.1832 | −0.1969 | −0.1975 | −0.1429 | −0.1310 | −0.1188 |
| Paper supply performance | | A | A | A | A | A | A | A | A | A |

TABLE 8

| Example (paper supply performance: 6-grade (A, B1, B2, C, D, E) evaluation) | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Vulcanization conditions | Primary vulcanization [° C. × min] | 160 × 30 | 160 × 30 | 160 × 30 | 160 × 30 | 160 × 30 | 160 × 30 | 160 × 30 | 160 × 30 | 160 × 30 |
| | Secondary vulcanization [° C. × min] | 160 × 60 | 160 × 60 | 160 × 60 | 160 × 60 | 160 × 60 | 160 × 60 | 160 × 60 | 160 × 60 | 160 × 60 |
| Viscoelasticity | E1(−30° C.) [MPa] | 4.62 | 7.95 | 4.34 | 5.26 | 7.07 | 4.62 | 3.45 | 1.13 | 1.26 |
| | E1(22° C.) [MPa] | 0.94 | 0.98 | 1.00 | 0.97 | 1.16 | 1.00 | 0.82 | 0.68 | 0.64 |

TABLE 8-continued

| Example (paper supply performance: 6-grade (A, B1, B2, C, D, E) evaluation) | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| | | tanδmax | 0.907 | 1.043 | 0.677 | 0.694 | 0.544 | 0.772 | 0.793 | 1.745 | 1.566 |
| | | T(tanδmax) [° C.] | −44.3 | −37.3 | −44.2 | −42.2 | −48.2 | −48.1 | −51.1 | −51.2 | −53.2 |
| | | 30% Mod (−40° C.) [MPa] | 1.09 | 2.19 | 1.04 | 1.27 | 1.48 | 0.96 | 0.78 | 0.29 | 0.32 |
| | | E1 (22° C.) number of parts by mass of softener [MPa/phr] | 0.0094 | 0.0098 | 0.0100 | 0.0097 | 0.0097 | 0.0083 | 0.0069 | 0.0057 | 0.0053 |
| Paper supply characteristics | Coefficient of friction of feed roll | 0 sheets (initial stage) | 2.249 | 2.776 | 2.392 | 2.587 | 1.657 | 2.061 | 2.007 | 2.465 | 2.485 |
| | | 1000 sheets | 1.727 | 1.633 | 1.893 | 1.804 | 1.455 | 1.753 | 1.636 | 1.845 | 1.844 |
| | | 5000 sheets | 1.414 | 1.224 | 1.349 | 1.318 | 1.249 | 1.576 | 1.406 | 1.632 | 1.594 |
| | | 10000 sheets | 1.298 | 1.264 | 1.242 | 1.087 | 1.172 | 1.253 | 1.195 | 1.350 | 1.438 |
| | | 20000 sheets | 1.085 | 1.059 | 1.101 | 1.079 | 1.010 | 1.214 | 1.067 | 1.275 | 1.349 |
| | | 30000 sheets | 1.203 | 1.086 | 1.216 | 1.047 | 0.948 | 1.121 | 1.070 | 1.299 | 1.333 |
| | | 40000 sheets | 0.972 | 0.827 | 0.968 | 0.909 | 0.980 | 0.918 | 1.038 | 1.394 | 1.370 |
| | Variation in outer diameter of retard roll | 0 sheets (initial stage) | 0 | 0 | 0 | 0 | 0 | 0 | 0 | 0 | 0 |
| | | 20000 sheets | | | | | | | | | |
| | | 40000 sheets | −0.1858 | −0.2048 | −0.1672 | −0.1899 | −0.1486 | −0.1757 | −0.2205 | −0.3164 | −0.3352 |
| Paper supply performance | | | B2 | B2 | B2 | B2 | B2 | B2 | B1 | B1 | B1 |

TABLE 9

| Example | | | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|---|
| Vulcanization conditions | Primary vulcanization [° C. × min] | | 160 × 30 | 160 × 30 | 160 × 30 | 160 × 30 | 160 × 30 | 160 × 30 | 160 × 30 | 160 × 30 |
| | Secondary vulcanization [° C. × min] | | 160 × 60 | 160 × 60 | 160 × 60 | 160 × 60 | 160 × 60 | 160 × 60 | 160 × 60 | 160 × 60 |
| Viscoelasticity | E1(−30° C.) [MPa] | | 3.82 | 3.53 | 3.19 | 3.69 | 3.54 | 2.70 | 1.48 | 2.80 |
| | E1(22° C.) [MPa] | | 0.94 | 0.88 | 0.79 | 0.85 | 0.83 | 0.79 | 0.72 | 0.90 |
| | tanδmax | | 0.788 | 0.847 | 0.849 | 0.825 | 0.813 | 0.960 | 1.535 | 0.983 |
| | T(tanδmax) [° C.] | | −51.2 | −51.2 | −51.2 | −50.2 | −50.2 | −52.1 | −53.1 | −52.1 |
| | 30% Mod (−40° C.) [MPa] | | 0.84 | 0.74 | 0.76 | 0.63 | 0.54 | 0.68 | 0.38 | 0.75 |
| | E1 (22° C.) number of parts by mass of softener [MPa/phr] | | 0.0078 | 0.0074 | 0.0066 | 0.0071 | 0.0069 | 0.0066 | 0.0060 | 0.0075 |
| Paper supply characteristics | Coefficient of friction of feed roll | 0 sheets (initial stage) | 2.044 | 2.206 | 2.130 | 2.148 | 2.203 | 2.104 | 2.394 | 2.151 |
| | | 1000 sheets | 1.758 | 1.769 | 1.714 | 1.821 | 1.679 | 1.756 | 1.856 | 1.771 |
| | | 5000 sheets | 1.419 | 1.493 | 1.419 | 1.544 | 1.649 | 1.625 | 1.698 | 1.614 |
| | | 10000 sheets | 1.404 | 1.278 | 1.238 | 1.334 | 1.287 | 1.433 | 1.484 | 1.207 |
| | | 20000 sheets | 1.133 | 1.189 | 1.244 | 1.238 | 1.291 | 1.317 | 1.372 | 1.129 |
| | | 30000 sheets | 1.077 | 1.181 | 1.190 | 1.180 | 1.149 | 1.326 | 1.233 | 1.193 |
| | | 40000 sheets | 1.091 | 1.175 | 1.000 | 1.210 | 1.080 | 1.352 | 1.288 | 1.102 |
| | Variation in outer diameter of retard roll | 0 sheets (initial stage) | 0 | 0 | 0 | 0 | 0 | 0 | 0 | 0 |
| | | 20000 sheets | | | | | | | | |
| | | 40000 sheets | −0.2209 | −0.2911 | −0.2467 | −0.2840 | −0.2351 | −0.3218 | −0.3692 | −0.2442 |
| Paper supply performance | | | B1 | B1 | B1 | B1 | B1 | B1 | B1 | B1 |

TABLE 10

| Example | | | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|---|---|
| Vulcanization conditions | Primary vulcanization [° C. × min] | | 160 × 30 | 160 × 30 | 160 × 30 | 160 × 30 | 160 × 30 | 160 × 30 | 160 × 30 | 160 × 30 | 160 × 30 |
| | Secondary vulcanization [° C. × min] | | 160 × 60 | 160 × 60 | 160 × 60 | 160 × 60 | 160 × 60 | 160 × 60 | 160 × 60 | 160 × 60 | 160 × 60 |

TABLE 10-continued

| Example | | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|---|
| Viscoelasticity | E1(−30° C.) [MPa] | 2.39 | 1.80 | 3.30 | 6.00 | 7.65 | 23.75 | | | |
| | E1(22° C.) [MPa] | 0.80 | 0.74 | 0.82 | 1.52 | 1.00 | 2.73 | | | |
| | tanδmax | 1.059 | 1.339 | 0.894 | 0.663 | 0.637 | 0.644 | | | |
| | T(tanδmax) [° C.] | −53.1 | −52.2 | −51.1 | −50.2 | −39.1 | −36.2 | | | |
| | 30% Mod (−40° C.) [MPa] | 0.67 | 0.41 | 0.79 | 1.07 | 1.90 | | | | |
| | E1 (22° C.) number of parts by mass of softener [MPa/phr] | 0.0067 | 0.0062 | 0.0068 | 0.0152 | 0.0100 | | | | |
| Paper supply characteristics | Coefficient of friction of feed roll | 0 sheets (initial stage) | 2.287 | 2.300 | 2.159 | Paper supply evaluation abandoned | 2.088 | Paper supply evaluation abandoned | Paper supply evaluation abandoned | Paper supply evaluation abandoned | Paper supply evaluation abandoned |
| | | 1000 sheets | 1.768 | 1.780 | 1.758 | | 1.580 | | | | |
| | | 5000 sheets | 1.439 | 1.540 | 1.762 | | 1.252 | | | | |
| | | 10000 sheets | 1.305 | 1.534 | 1.296 | | 0.996 Stopped | | | | |
| | | 20000 sheets | 1.287 | 1.347 | 1.365 | | | | | | |
| | | 30000 sheets | 1.276 | 1.440 | 1.326 | | | | | | |
| | | 40000 sheets | 1.120 | 1.430 | 1.221 | | | | | | |
| | Variation in outer diameter of retard roll | 0 sheets (initial stage) | 0 | 0 | 0 | | | | | | |
| | | 20000 sheets | | | −0.1195 | | | | | | |
| | | 40000 sheets | −0.2571 | −0.3829 | −0.2225 | | | | | | |
| Paper supply performance | | B1 | B1 | B1 | D | C | D | E | E | E |

The results shown in Tables 6 to 10 and FIG. 19 clarified that when the 30% Mod (−40° C.), i.e., the modulus in 30% elongation at −40° C. is less than or equal to 0.94 MPa, it is possible to obtain a high residual coefficient of friction.

The results shown in Tables 6 to 10 and FIG. 20 clarified that when the dynamic modulus of elasticity at −30° C. E1 (−30° C.) obtained in the dynamic viscoelasticity measurement is less than or equal to 4.2 MPa, it is possible to obtain a high residual coefficient of friction.

The results shown in Tables 6 to 10 and FIG. 21 clarified that the E1 (22° C.)/number of parts by mass of softener is greater than or equal to 0.008 MPa/phr, it is possible to obtain high wear resistance.

The results shown in FIG. 22 clarified that when the examples are compared with the comparative examples in terms of the same E1 (22° C.)/number of parts by mass of softener, the examples can give smaller 30% Mods (−40° C.) than the 30% Mods (−40° C.) of the comparative examples. That is, it is clarified that the examples can achieve higher levels of both residual coefficient of friction and wear resistance than the residual coefficients of friction and the wear resistance of the comparative examples.

The results shown in FIG. 23 clarified that when the examples are compared with the comparative examples in terms of the same E1 (22° C.)/number of parts by mass of softener, the examples can give smaller E1s (−30° C.) than the E1s (−30° C.) of the comparative examples. That is, it is clarified that the examples can achieve higher levels of both residual coefficient of friction and wear resistance than the residual coefficients of friction and the wear resistance of the comparative examples.

Comparative Examples 1 and 2 that contain as the softener a paraffin-based petroleum blended oil (processed oil) having a kinematic viscosity at 40° C. of greater than 60 mm$^2$/s are assumed to have increased the 30% Mod (−40° C.) to greater than 0.94 MPa (as well as having increased the E1 (−30° C.) to greater than 4.2 MPa) and thus lowered the residual coefficient of friction.

Comparative Examples 3 and 4 that contain as the softener a hydrocarbon-based synthetic oil having a kinematic viscosity at 40° C. of greater than 60 mm$^2$/s are assumed to have increased the 30% Mod (−40° C.) to greater than 0.94 MPa (as well as having increased the E1 (−30° C.) to greater than 4.2 MPa) and thus lowered the residual coefficient of friction.

Comparative Example 5 that contained an EPDM with a grade having a content of the ethylene component unit of as extremely a high value as 73% by mass are assumed to have increased the 30% Mod (−40° C.) to greater than 0.94 MPa (as well as having increased the E1 (−30° C.) to greater than 4.2 MPa) and thus lowered the residual coefficient of friction.

Comparative Example 6 that contains sulfur in a blending amount of as many as 3 phr and a vulcanization accelerator system strong in action of accelerating vulcanization is assumed to have increased the 30% Mod (−40° C.) to greater than 0.94 MPa (as well as having increased the E1 (−30° C.) to greater than 4.2 MPa) and thus lowered the residual coefficient of friction.

Comparative Examples 7 to 20 that contained the softener in a blending amount of as many as 120 phr are assumed to have decreased the E1 (22° C.)/number of parts by mass of softener to less than 0.008 MPa/phr and thus lowered the wear resistance.

Comparative Example 21 that contained as the softener a paraffin-based petroleum blended oil (processed oil) having a kinematic viscosity at 40° C. of as low as 12.4 mm$^2$/s allowed the press molding but caused the softener to volatilize a lot in the following secondary vulcanization process performed for suppressing bleed, and the roll sample was largely contracted for the large volatilization volume to give no roll sample having the desired shape. Therefore, the paper supply test was abandoned.

Comparative Example 22 that contains as the softener a hydrocarbon-based synthetic oil having a kinematic viscosity at 40° C. of much greater than 60 mm$^2$/s is assumed to have increased the 30% Mod (−40° C.) to greater than 0.94 MPa (as well as having increased the E1 (−30° C.) to greater than 4.2 MPa) and thus lowered the maintainability of a coefficient of friction to give a residual coefficient of friction of less than 1.0 only with supply of 10,000 sheets of paper.

Comparative Example 23 that contained as the softener an isoparaffin agent having a kinematic viscosity at 40° C. of as low as 11.0 mm²/s allowed the press molding but caused the softener to volatilize a lot in the following secondary vulcanization process performed for suppressing bleed, and the roll sample was largely contracted for the large volatilization volume to give no roll sample having the desired shape. Therefore, the paper supply test was abandoned.

Comparative Examples 24 to 26 that contained an EPDM having a content of the diene component unit (ENB) (content of ENB as an weighted average in Comparative Examples 25 and 26 that have two EPDMs blended therein) of less than 2.8% by mass were incapable of securing the cross-link density necessary for exerting rubber elasticity, resulting in giving no roll sample having the desired shape in the vulcanization process. Therefore, the paper supply test was abandoned.

In order to achieve high levels of both the residual coefficient of friction and the wear resistance, it is necessary to decrease the 30% Mod (−40° C.) and increase the E1 (22° C.)/number of parts by mass of softener, or decrease the E1 (−30° C.) and increase the E1 (22° C.)/number of parts by mass of softener. These factors, however, are incompatible characteristics, so that both the characteristics have not been achieved with conventional blending techniques.

Figure 25:
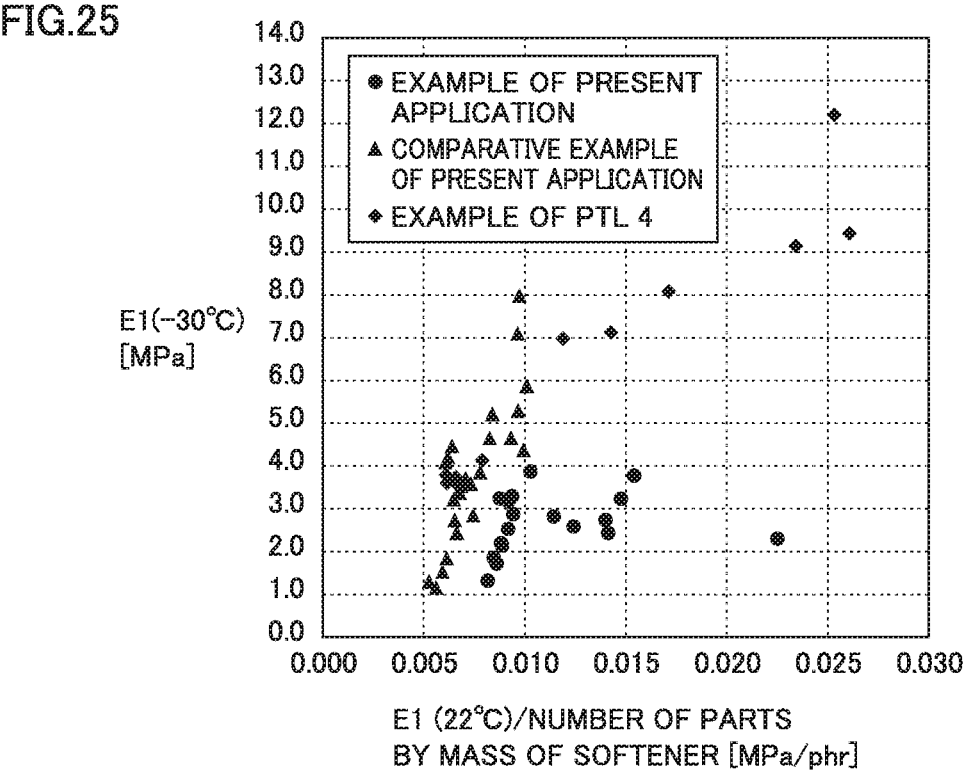
FIG. 25 is a graph illustrating a relationship between the E1 (22° C.)/number of parts by mass of softener and the E1 (−30° C.) in the examples, the comparative examples, and examples of PTL 4.

For example, FIG. 25 is given by adding to FIG. 23 a relationship between the E1 (−30° C.) and the E1 (22° C.)/number of parts by mass of softener in examples of PTL 4. As clarified by FIG. 25, even application of the blending technique in PTL 4 increases the E1 (−30° C.) to decrease the maintainability of a coefficient of friction when the E1 (22° C.)/number of parts by mass of softener is increased to enhance the wear resistance, as in the comparative examples of the present specification. Application of the technique in the present application, however, enables suppression of a rise in E1 (−30° C.) even when the E1 (22° C.)/number of parts by mass of softener is increased as illustrated by the plots of the examples of the present application in FIG. 25. As a result, it is possible to enhance the wear resistance while retaining and improving the maintainability of the coefficient of friction that is an advantage of PTL 4.

The embodiments and the examples that have been disclosed this time should be considered in all aspects as exemplary but not as limiting. The scope of the present invention is defined by the claims, rather than the embodiments described above, and is intended to include any modifications within the scope and meaning equivalent to the claims.

REFERENCE SIGNS LIST

10: Paper feed roll, 10F: Feed roll, 10P: Pick-up roll, 10R: Retard roll, 10S: Separation mechanism, 11: Rubber layer, 12: Shaft, 20: Baseplate, 30: Load cell, F: Friction force, W: Load, $F_B$: Feeding force applied by feed roll to first sheet of paper, $F_C$: Feeding force applied by first sheet of paper to second sheet of paper, $F_D$, $F_E$: Return resistance force between sheets of paper, $F_{pp}$, $R_A$: Resistance force between sheets of paper, P: Paper, $P_B$: Motion pressure of retard roll, Q: Adhesion force between sheets of paper, $R_S$: Radius of retard roll, $T_A$: Return force of torque limiter, $T_r$: Torque limiter torque, $\mu$: Coefficient of friction, $\mu_p$: Coefficient of friction between sheets of paper, $\mu_r$: Coefficient of friction between rubber roll and paper, L1, L1q: Overlap feed boundary, L2, L2q: Non-feed boundary, L3: FRR motion line, R, Rq: Appropriate region

The invention claimed is:

1. A rubber composition for a paper feed roll, the composition comprising at least a polymer component and a softener and having
   a 30% Mod (−40° C.) of less than or equal to 0.94 MPa, the 30% Mod (−40° C.) representing a modulus in 30% elongation at −40° C., and
   an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in temperature variance measurement of dynamic viscoelasticity, divided by the number of parts by mass of the softener relative to 100 parts by mass of the polymer component.

2. The rubber composition for a paper feed roll according to claim 1, the composition having
   the 30% Mod (−40° C.) of less than or equal to 0.80 MPa and
   a T(tan δmax) of less than or equal to −50° C., the T(tan δmax) representing a temperature at which a loss tangent tan δ exhibits a maximum value (tan δmax) in the temperature variance measurement of dynamic viscoelasticity.

3. A rubber composition for a paper feed roll, the composition comprising at least a polymer component and a softener and having
   an E1 (−30° C.) of less than or equal to 4.2 MPa, the E1 (−30° C.) representing a dynamic modulus of elasticity at −30° C. in temperature variance measurement of dynamic viscoelasticity, and
   an E1 (22° C.)/number of parts by mass of softener of greater than or equal to 0.008 MPa/phr, the E1 (22° C.)/number of parts by mass of softener representing a value of a dynamic modulus of elasticity at 22° C. E1 (22° C.) in the temperature variance measurement of dynamic viscoelasticity, divided by the number of parts by mass of the softener relative to 100 parts by mass of the polymer component.

4. The rubber composition for a paper feed roll according to claim 3, the composition having
   the E1 (−30° C.) of less than or equal to 3.8 MPa and
   a T(tan δmax) of less than or equal to −50° C., the T(tan δmax) representing a temperature at which a loss tangent tan δ exhibits a maximum value (tan δmax) in the temperature variance measurement of dynamic viscoelasticity.

5. The rubber composition for a paper feed roll according to claim 1, wherein the polymer component contains an ethylene-propylene-diene copolymer.

6. The rubber composition for a paper feed roll according to claim 5, wherein the ethylene-propylene-diene copolymer contains greater than or equal to 52% by mass and less than or equal to 70% by mass of an ethylene component unit and greater than or equal to 2.8% by mass and less than or equal to 5.5% by mass of a diene component unit.

7. The rubber composition for a paper feed roll according to claim 1, the composition comprising greater than or equal to 45 parts by mass and less than or equal to 110 parts by mass of the softener relative to 100 parts by mass of the polymer component.

8. The rubber composition for a paper feed roll according to claim 7, wherein the softener is at least one of a paraffin-based petroleum blended oil, a poly-α-olefin, and a long-chain alkyl carbonate each having a kinematic viscosity at 40° C. of greater than or equal to 10 mm²/s and less than or equal to 60 mm²/s.

9. The rubber composition for a paper feed roll according to claim 8, wherein the softener is at least one of a poly-α-olefin and a long-chain alkyl carbonate each having a kinematic viscosity at 40° C. of greater than or equal to 10 mm$^2$/s and less than or equal to 30 mm$^2$/s.

10. The rubber composition for a paper feed roll according to claim 1, the composition comprising, as a cross-linking agent, greater than or equal to 1 part by mass and less than or equal to 2.8 parts by mass of sulfur relative to 100 parts by mass of the polymer component.

11. A paper feed roll comprising a rubber layer formed of the rubber composition for a paper feed roll according to claim 1.

12. The rubber composition for a paper feed roll according to claim 3, wherein the polymer component contains an ethylene-propylene-diene copolymer.

13. The rubber composition for a paper feed roll according to claim 12, wherein the ethylene-propylene-diene copolymer contains greater than or equal to 52% by mass and less than or equal to 70% by mass of an ethylene component unit and greater than or equal to 2.8% by mass and less than or equal to 5.5% by mass of a diene component unit.

14. The rubber composition for a paper feed roll according to according to claim 3, the composition comprising greater than or equal to 45 parts by mass and less than or equal to 110 parts by mass of the softener relative to 100 parts by mass of the polymer component.

15. The rubber composition for a paper feed roll according to claim 14, wherein the softener is at least one of a paraffin-based petroleum blended oil, a poly-α-olefin, and a long-chain alkyl carbonate each having a kinematic viscosity at 40° C. of greater than or equal to 10 mm$^2$/s and less than or equal to 60 mm$^2$/s.

16. The rubber composition for a paper feed roll according to claim 15, wherein the softener is at least one of a poly-α-olefin and a long-chain alkyl carbonate each having a kinematic viscosity at 40° C. of greater than or equal to 10 mm$^2$/s and less than or equal to 30 mm$^2$/s.

17. The rubber composition for a paper feed roll according to according to claim 3, the composition comprising, as a cross-linking agent, greater than or equal to 1 part by mass and less than or equal to 2.8 parts by mass of sulfur relative to 100 parts by mass of the polymer component.

18. A paper feed roll comprising a rubber layer formed of the rubber composition for a paper feed roll according to according to claim 3.

* * * * *